US012716269B2

(12) United States Patent
Zhang et al.

(10) Patent No.: US 12,716,269 B2
(45) Date of Patent: *Aug. 25, 2026

(54) COMBINATION LOCK WITH OVERRIDE KEY

(71) Applicant: Security People, Inc., Houston, TX (US)

(72) Inventors: An Zhang, Shaoguan City (CN); T. Asil Gokcebay, Petaluma, CA (US)

(73) Assignee: Security People, Inc., Houston, TX (US)

( * ) Notice: Subject to any disclaimer, the term of this patent is extended or adjusted under 35 U.S.C. 154(b) by 176 days.

This patent is subject to a terminal disclaimer.

(21) Appl. No.: 18/626,015

(22) Filed: Apr. 3, 2024

(65) Prior Publication Data

US 2024/0301721 A1 Sep. 12, 2024

Related U.S. Application Data

(63) Continuation-in-part of application No. 18/533,198, filed on Dec. 8, 2023, now Pat. No. 12,044,038,
(Continued)

(51) Int. Cl.
*E05B 47/06* (2006.01)
*E05B 37/00* (2006.01)
(Continued)

(52) U.S. Cl.
CPC ...... *E05B 47/0657* (2013.01); *E05B 37/0034* (2013.01); *E05B 37/0048* (2013.01);
(Continued)

(58) Field of Classification Search
CPC ............. E05B 37/0034; E05B 37/0048; E05B 37/0058; E05B 37/0096; E05B 41/00;
(Continued)

(56) References Cited

U.S. PATENT DOCUMENTS 8,316,675 B2 11/2012 Yang
10,487,541 B1 * 11/2019 Zhang ................ G07C 9/00666
(Continued)

FOREIGN PATENT DOCUMENTS

EP 2942457 A1 11/2015

OTHER PUBLICATIONS

EPO Machine translation of specification of EP 2942457.

*Primary Examiner* — Suzanne L Barrett

(57) ABSTRACT

A combination lock can be operated manually via the manipulation of rotatable dials and by way of a key, such as an electronic key. The lock includes one or more rotatable dials each having multiple indicia disposed thereon. Rotation of the rotatable dials to predetermined indicia places the lock in the unlocked position. The lock can further include an electronic port and an actuator. Upon receipt of a predetermined credential via the port, the actuator can place the lock in in the unlocked position. The lock further includes a knob that, when the lock is in the unlocked position, can be rotated between a first position in which the lock is in a latched position and a second position in which the lock is in an unlatched position. The combination lock may automatically scramble the positions of the dials upon opening for security purposes.

20 Claims, 36 Drawing Sheets

Related U.S. Application Data which is a continuation-in-part of application No. 17/106,911, filed on Nov. 30, 2020, now Pat. No. 11,913,256, which is a continuation of application No. 16/687,223, filed on Nov. 18, 2019, now Pat. No. 10,851,563, which is a continuation-in-part of application No. 16/427,226, filed on May 30, 2019, now Pat. No. 10,487,541.

(51) Int. Cl.

| | |
|---|---|
| ***E05B 37/12*** | (2006.01) |
| ***E05B 47/00*** | (2006.01) |
| ***E05B 49/00*** | (2006.01) |
| ***G07C 9/00*** | (2020.01) |
| *E05B 65/02* | (2006.01) |

(52) U.S. Cl.

CPC .......... *E05B 37/12* (2013.01); *E05B 47/0001* (2013.01); *E05B 47/0603* (2013.01); *E05B 47/0673* (2013.01); *E05B 49/00* (2013.01); *G07C 9/00182* (2013.01); *E05B 2047/0084* (2013.01); *E05B 65/025* (2013.01)

(58) Field of Classification Search

CPC ............. E05B 47/0001; E05B 47/0603; E05B 47/0673; E05B 49/00; E05B 65/025; E05B 2047/0084; E05B 47/0657; E05Y 2900/208; G07C 9/00571; G07C 9/00182; G07C 2009/00769; Y10T 70/7068; Y10T 70/7141; Y10T 70/7147

USPC ........................................... 70/284, 285, 432

See application file for complete search history.

(56) References Cited

U.S. PATENT DOCUMENTS

| | | | | |
|---|---|---|---|---|
| 10,851,563 | B1 * | 12/2020 | Zhang | E05B 37/12 |
| 12,044,038 | B2 * | 7/2024 | Zhang | G07C 9/00666 |
| 2007/0214850 | A1 * | 9/2007 | Ma | E05B 35/105<br>70/284 |
| 2010/0257907 | A1 * | 10/2010 | Yu | E05B 37/02<br>70/284 |
| 2023/0088900 | A1 * | 3/2023 | Ho | E05B 37/02<br>70/284 |

* cited by examiner

COMBINATION LOCK WITH OVERRIDE KEY

CROSS REFERENCE TO RELATED APPLICATIONS

This application is a continuation-in-part of, and claims priority to, U.S. patent application Ser. No. 18/533,198, filed on Dec. 8, 2023, which is a continuation-in-part of, and claims priority to, U.S. patent application Ser. No. 17/106,911, filed on Nov. 30, 2020, which is a continuation of, and claims priority to, U.S. patent application Ser. No. 16/687,223, which issued as U.S. Pat. No. 10,851,563, on Dec. 1, 2020, which is a continuation-in-part of U.S. patent application Ser. No. 16/427,226, filed on May 30, 2019, which issued as U.S. Pat. No. 10,487,541 on Nov. 26, 2019.

FIELD OF THE INVENTION

The disclosed subject matter concerns the security of lockers, safes, desks, file cabinets, closets, or other items of furniture and storage devices assigned for temporary or long-term use, as well as doors for human ingress and egress. In particular, disclosed herein is a mechanical combination lock, having no battery power, that includes an electronic key override. In one instance, the disclosed combination lock can be used in conjunction with a locker having a standard three-hole locker door prep layout, to replace a standard key or combination lock fitting the same locker door. In another instance, the combination lock automatically scrambles the positions of the dials upon opening for security purposes.

BACKGROUND OF THE INVENTION

Combination locks, such as those for lockers, are known. Lockers in secondary schools and health club locker rooms may include a mechanical combination lock with a mechanical key override. The mechanical key can be used when a student or a user has forgotten his or her combination, and an administrator can use the mechanical key to both open the lock and reset the combination. Moreover, a school administrator uses the mechanical key at the end of a school year to open all lockers, to individually re-set all combinations, then records the new combinations of each locker. Many of these locks have mechanical key lock cylinders inside the lock which are either not accessible to rekey or are very labor intensive to remove, rekey, and reinstall. The administrator must do so to ensure that the older students who were previously assigned a locker do not have the combination for the forthcoming years. This process is laborious, time-consuming, and expensive. Moreover, if the administrator key is lost, the locks must be re-cored or re-keyed. Other mechanical combination locks having mechanical override keys are known. See, for example, U.S. Pat. No. 9,222,283, assigned to the assignee of the present application, U.S. Pat. Nos. 6,877,345, 7,444,844, 7,628,047, 7,958,757, 8,234,891, 8,316,675, and U.S. Patent Application Publication Nos. 2009/0301147 and 2008/0307838.

U.S. Pat. No. 8,769,999 describes a mechanical combination lock, where a mechanical key can be used with the lock to identify the unlocking combination. While it primarily describes a mechanical key, in a parenthetical it mentions an electronically operated mechanism that can identify the unlocking combination. But it fails to disclose any structure whatsoever for the electronically operated mechanism or how it operates.

Electronically-operated locks, moreover, are known as well. U.S. Pat. Nos. 5,886,644 and 5,894,277, owned by the assignee of this application, describe electronic locker locks to fit a standard three-hole door prep layout as well as other doors. The electronic locks described in those patents comprise two housings, mounted at front and back of the door, and electronically connected through the center hole of the three-hole door prep layout, and they included an electromagnetically-driven latch, retracted automatically by the lock device when the proper code was entered by a user, either via a keypad or an electronic ID device such as an iButton®. U.S. Pat. No. 8,161,781 likewise discloses an electronically-operated lock to fit a standard three-hole door prep. All three patents are incorporated herein by reference.

U.S. Pat. No. 9,121,199 discloses an electronic combination lock that can be operated via touchscreen and also with an electronic key. The same access code is sent to the microprocessor to open the lock, regardless of whether the access code is entered via the touchscreen or input via the electronic key.

There is a need for a mechanical combination lock that can be opened by an administrator or manager with an electronic key of relatively inexpensive construction, particularly for lockers but with more versatility as to use on various standard designs, modularity as to assembly and opposite-hand use, easy programmability and convenience and simplicity to the user. It would be particularly advantageous if the mechanical combination lock required no battery storage within its housing, but still permitted an electronic key to override the mechanical combination and unlock it. Finally, it would be advantageous if the lock scrambled the dial combination upon opening.

DETAILED DESCRIPTION

Figure 1:
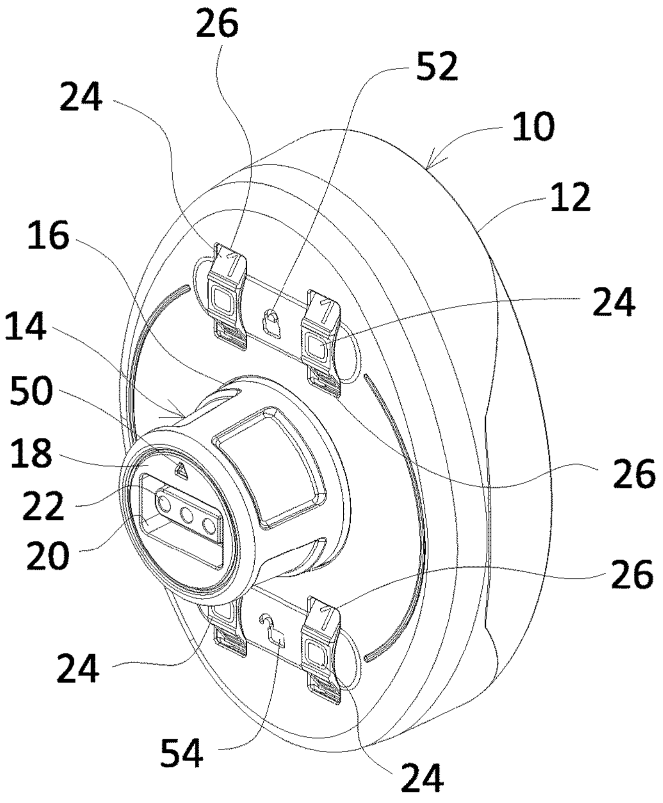
FIG. 1 is a perspective view of a lock assembly with an electronic key bypass.
Figure 2:
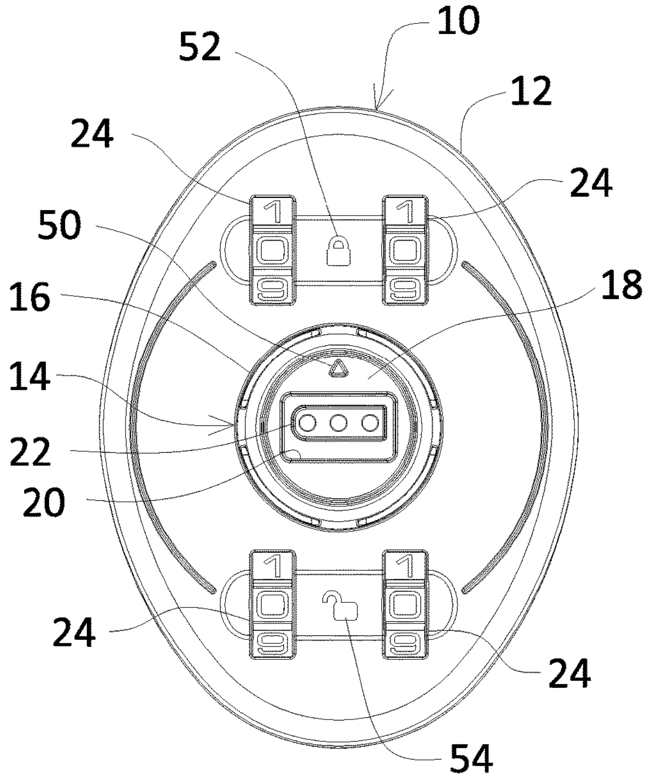
FIG. 2 is a front view of the lock assembly of FIG. 1.

FIGS. 1 and 2 show a first example of a lock assembly 10 suitable for use on cabinets, closets, lockers, drawers, doors, safes, and other items of furniture, as well as doors for human ingress and egress. In this example, the lock assembly 10 is what is known as 'shared use' mode. This mode is typical for, e.g., lockers in a gym, where lockers are not assigned to specific individuals, where different individuals may use the same locker each day, and where an individual must select an empty locker upon each visit. In shared use, prior to using the locker, the user must first set the unlocking combination, and when the user later returns to the locker and uses the unlocking combination to unlock and unlatch the lock assembly 10, the unlocking combination is erased, and the next user must set a new unlocking combination.

The lock assembly 10 includes an outer housing 12 and a knob assembly 14 that can rotate relative to the outer housing 12. The knob assembly 14 includes a knob housing 16 having a front face 18, and an opening 20 in the front face 18 sized and shaped to receive a port 22. The lock assembly 10 also includes four rotatable dials 24, each of which includes indicia thereon, in this case the numbers 0-9. A portion of each rotatable dial 24 is visible and accessible through a respective opening 26 in the outer housing 12. A user may rotate the dials 24 to align a selected of the indicia in the openings 26 to a specific combination of numbers both to (a) set the combination that will unlock the lock assembly 10 and (b) to unlock the lock assembly 10, which will allow the user to rotate the knob assembly 14. The port 22 may be used to receive power and data, as will be described below.

Figure 3:
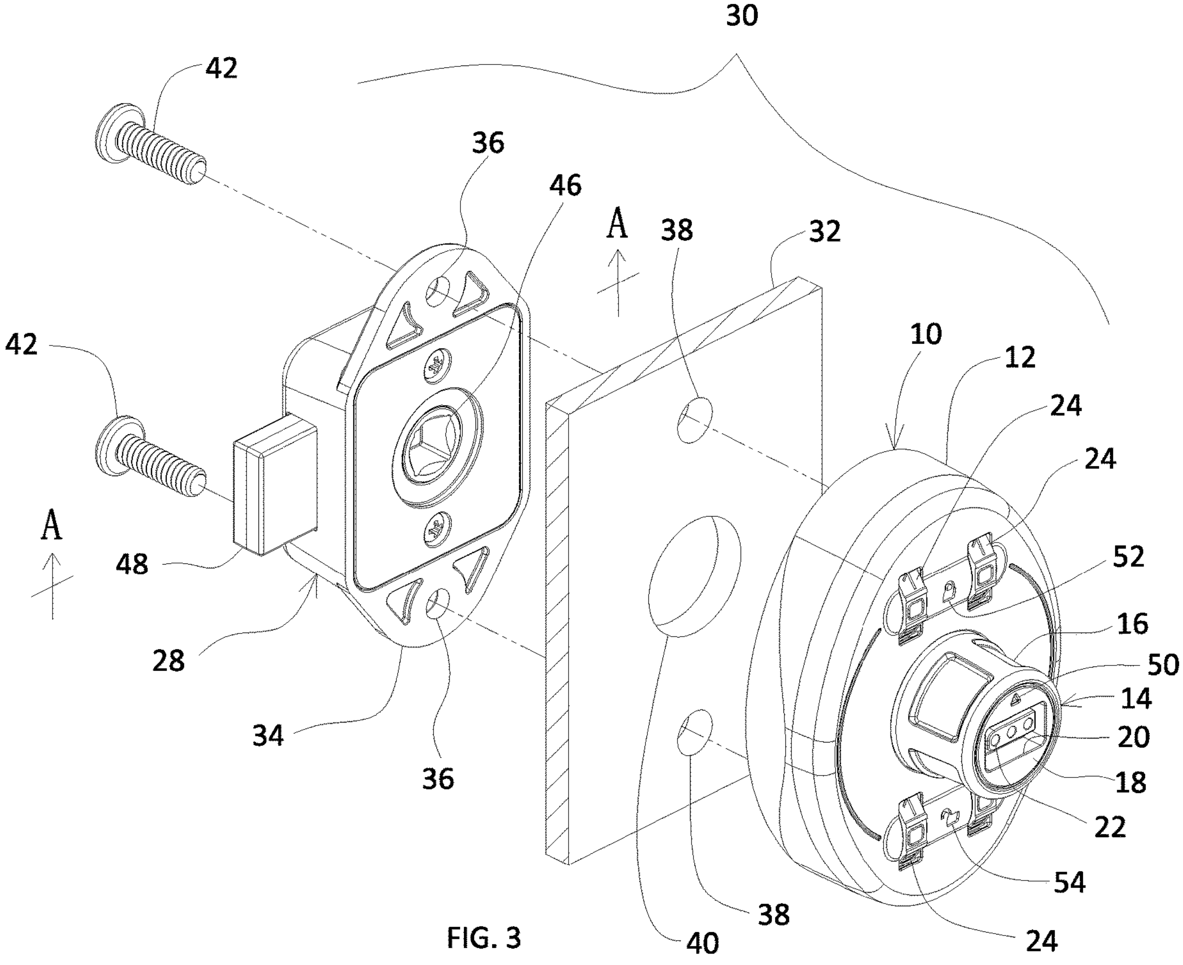
FIG. 3 is an exploded perspective view of a combination lock including the lock assembly of FIG. 1, a panel with a three hole prep, and a bolt housing.
Figure 4:
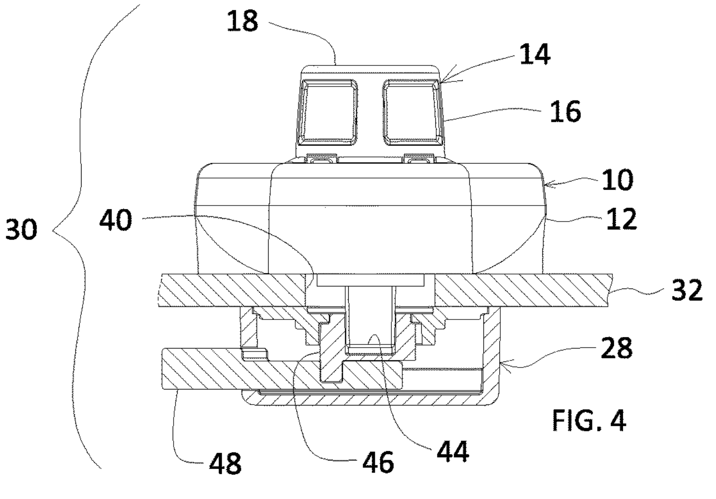
FIG. 4 is a bottom view of the combination lock of FIG. 3 with the bolt housing in section view taking along line A-A in FIG. 3.

FIGS. 3 and 4 depict the lock assembly 10 combined with a standard deadbolt assembly 28 to form a combination lock 30, with the combination lock 30 mounted to a panel 32. The deadbolt assembly 28 includes a deadbolt housing 34 that include two mounting through holes 36. The panel 32 may be a door on an item of furniture, as described above, and includes two mounting holes 38 and a shaft hole 40 to form of a standard three-hole locker prep. Two threaded fasteners 42 mount the deadbolt assembly 28 and the lock assembly 10 both to the panel 32 and to each other by extending through the mounting holes 36 of the deadbolt housing 34 and through the mounting holes 38 of the panel 32 into internally threaded holes (not shown) in the lock assembly 10.

The lock assembly 10 includes a drive shaft 44 extending out its rear side, best seen in FIG. 4. The deadbolt assembly 28 includes a shaft receiver 46 that accepts the shaft 44. The deadbolt assembly 28 further includes a deadbolt 48 that is coupled to the shaft receiver 46. As is known, when the lock assembly 10 is unlocked, a user may rotate the knob assembly 14, which rotates the shaft 44 and shaft receiver 46. The shaft receiver 46 shifts the deadbolt 48 laterally relative to the deadbolt housing 34 between a bolted position in which the deadbolt 48 extends out from the deadbolt housing 34, and an unbolted position, where the deadbolt 48 is retracted at least partially within the deadbolt housing 34. Disposed on the front face 18 is an arrow 50. The outer housing 12 includes a locked symbol 52 and an unlocked symbol 54. When the knob assembly 14 is rotated such that the arrow 50 points to the locked symbol 52, the lock assembly 10 is configured such that the deadbolt 48 is extended out of the deadbolt housing 34 in the bolted position where the combination lock 30 can secure the panel 32 on, e.g., an item of furniture, in a closed position. When the knob assembly 14 is rotated, and the arrow 50 no longer points to the locked symbol 52 but instead points to the unlocked symbol 54, the deadbolt 48 is pulled within the deadbolt housing 34 to an unbolted position, and the panel 32 may be opened relative to the item of furniture, closet, door frame, etc.

Figure 5:
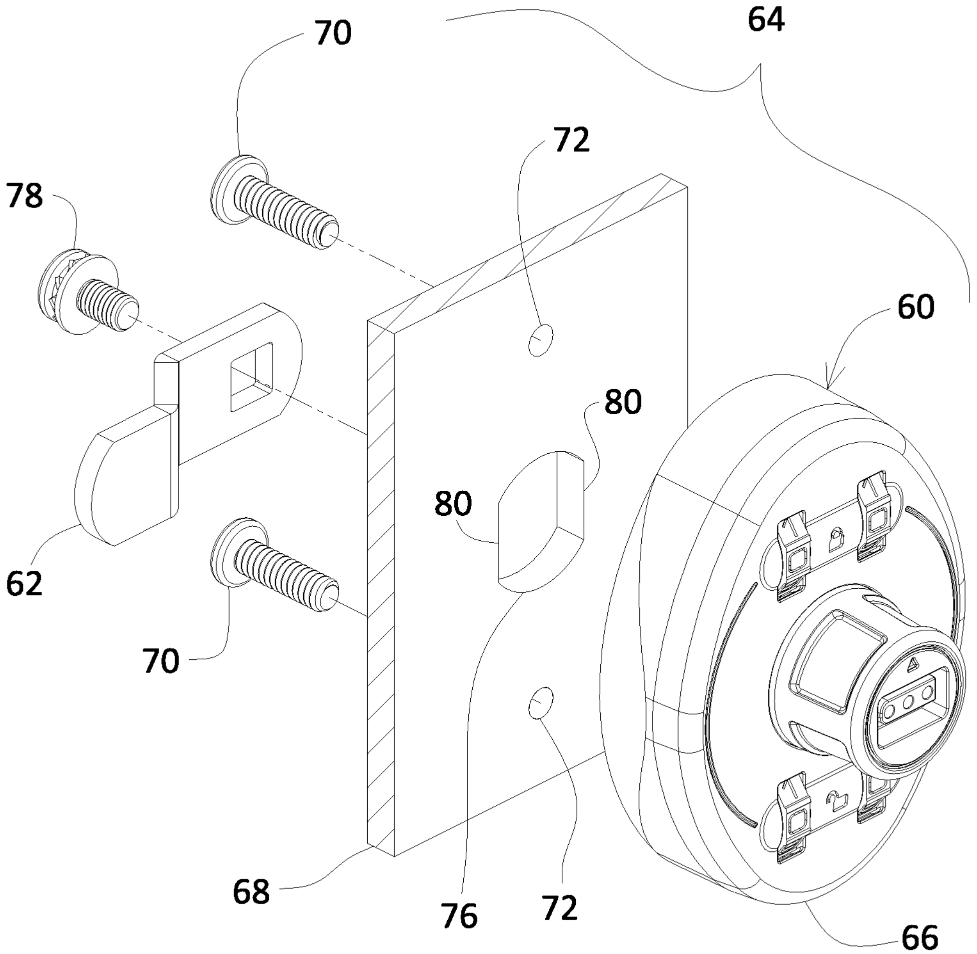
FIG. 5 is an exploded perspective view of a second example of a combination lock including a second example of a lock assembly, a panel with three-hole prep, and a locking cam blade.
Figure 6:
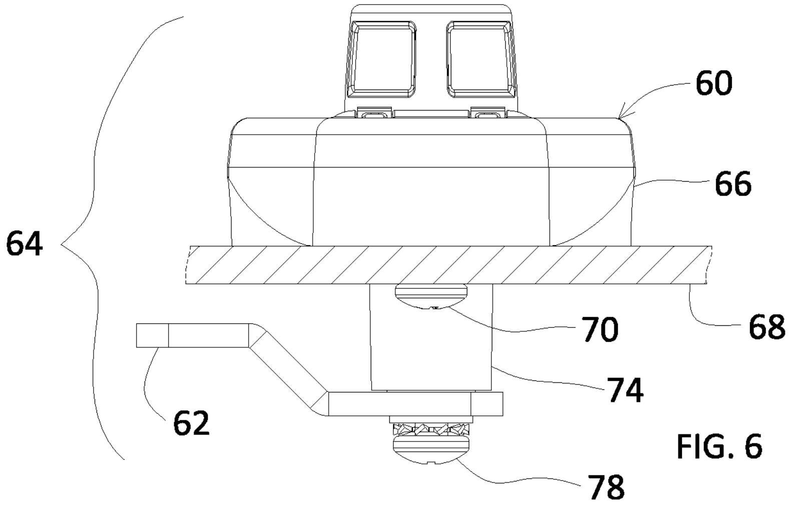
FIG. 6 is a bottom view of the combination lock of FIG. 5.

Referring now to FIGS. 5 and 6, a second example of a lock assembly 60 is shown assembled to a cam blade 62 to form a second example of a combination lock 64. The lock assembly 60 is assembled to a panel 68 via two threaded fasteners 70 extending through two through holes 72 in the panel 68. The lock assembly 60 includes a shaft housing 74 extending away from the backside of the lock housing 66 through a shaft hole 76 in the panel 68. A shaft (not seen in this embodiment) extends through the shaft housing 74, and a threaded hole is accessible on the back side of the shaft. The cam blade 62 is attached to the shaft via a screw 78. The shaft hole 76 in the panel 68 may include flat sides 80. The lock assembly 60 may be used to replace a conventional mechanical cam lock, and the shaft hole 76 in the panel 68 may have these flat sides 80 based on the prior cam lock usage. To convert, the user will only need to add the two through holes 72. The combination lock 64 of FIGS. 5 & 6 operates similarly to that of the combination lock 30 of FIGS. 3 & 4 except that the cam blade 62 is rotated between a latched position shown in FIGS. 5 and 6 and an unlatched position in which the cam blade 62 would be in a horizontal position.

This disclosure discloses locking elements including a deadbolt 48 and a cam blade 62, although other locking elements, such as retractable slam latches, are known in the art and can be employed. Moreover, this disclosure refers to a 'latched position.' This term should be understood broadly and encompasses all types of locking elements, such as the deadbolt 48, the cam blade 62, slam latches, and the like, in a position that can maintain the panel 32 in a closed position, and an "unlatched position" where the locking element does not impede opening and closing of the panel. Moreover, in most instances, the combination lock 30 will be station on a door panel which pivots to provide access to, e.g., an interior of an item of furniture. The combination lock 30 could also be located on the frame, with the door panel being pivoted relative to the frame.

Figure 7:
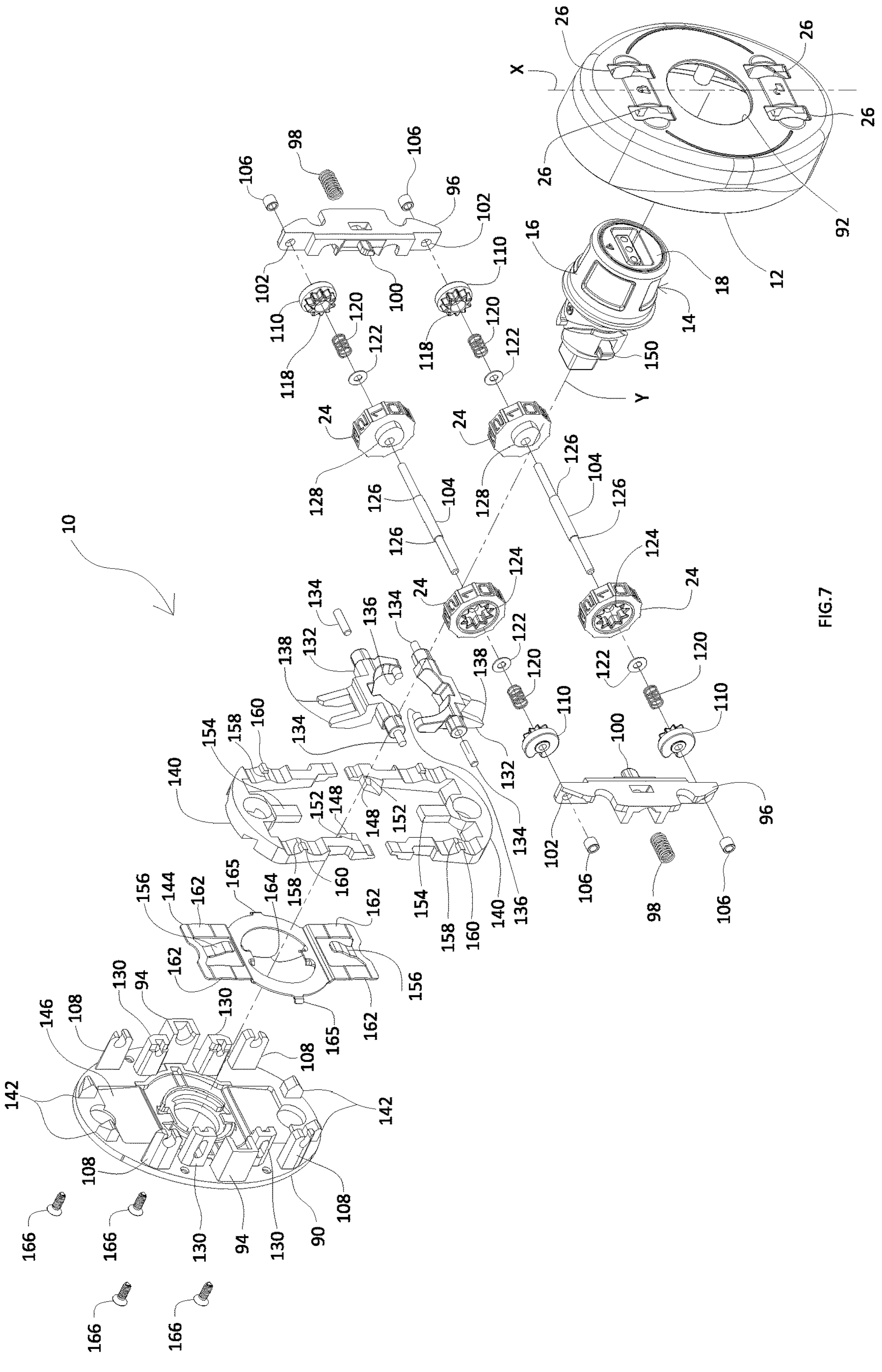
FIG. 7 is a perspective exploded view of the lock assembly of FIG. 1.

Referring now to FIG. 7, the internal components of the lock assembly 10 are shown, which are generally enclosed by the outer housing 12, the knob housing 16, and a back plate 90. The outer housing 12 includes a knob opening 92 and the four dial openings 26 through which the rotatable dials 24 are accessible. In general, when referencing the direction "down," it will be understood that the direction along axis Y towards the back plate 90 is being described. Likewise, the direction "up" shall refer to the direction along axis Y toward the front face 18. Moreover, the direction "in" or "inwardly" shall refer to a direction towards the axis X, and a direction "out" or "outwardly" shall refer to a direction away from the axis X.

Extending up from the back plate 90 are a pair of side mounts 94, and a pair of side plates 96 are mounted in the side mounts 94 and able to shift inwardly and outwardly relative to middle axis X. The side plates 96 are biased inwardly by side plate springs 98. Each side plate 96 includes a lug 100 extending inwardly that interacts with the knob assembly 14, as will be described in more detail later. Each side plate 96 includes a pair of mounting holes 102 which receive ends of two axles 104. Caps 106 capture each end of each axle 104. Moreover, the back plate 90 includes two pairs of axle mounts 108 in which the caps 106 are supported.

Figure 7A:
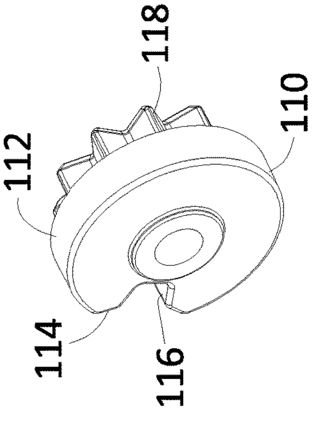
FIG. 7*a* is a detail perspective view of a toggle plate depicted in FIG. 7.

Disposed on each of the axles 104 are two toggle plates 110, which are shown in detail in FIG. 7*a*. Each toggle plate 110 includes a circular outer surface 112, a flat surface 114, and a notch 116 in the flat surface 114. Each toggle plate 110 also includes a ten-point spur gear 118 extending inwardly toward middle axis X. Also disposed on each axle 104 is a pair of toggle plate springs 120, a pair of washers 122, and two of the rotatable dials 24 that are biased away from the toggle plates 110 by the toggle plate springs 120. Each rotatable dial 24 forms an internal ten point ring gear 124 that is complementary to each ten point spur gear 118. In other words, each rotatable dial 24 can engage a respective toggle plate 110 is any of ten distinct rotational orientations, corresponding to the numerical indicia 0-9 on the rotatable dials. Both axles 104 include shoulders 126 that locate the washers 122 laterally due to the force of the inward push of the toggle plate spring 120. The rotatable dials 24 are located laterally by the openings 26, and the washers 122 bear the force of the springs 120, allowing the rotatable dials 24 to rotate freely.

Each rotatable dial 24 includes on its inward side an eccentric cam 128 that may be used to rotationally orient the rotatable dial 24. The surface of the eccentric cam 128 is closest to the axle 104 on a side opposite the number "0" on the rotatable dial 24, the significance of which will be described below.

When the side plates 96 are shifted inwardly (toward middle axis X), the toggle plates 110 are shifted inwardly, and the spur gears 118 of the toggle plates 110 are disposed within the ring gears 124 of the rotatable dials 24. In this position, rotation of a rotatable dial 24 rotates the respective toggle plate 110. When the side plates 96 are shifted outwardly (away from middle axis X), the toggle plate springs 120 push the toggle plates 110 outwardly, but the rotatable dials 24 remain in the same lateral position on the axles 104. In this position, the spur gears 118 of the toggle plates 110 are displaced from the ring gears 124 of the rotatable dials 24, and the rotatable dials 24 are able to be rotated independently of and relative to the toggle plates 110.

Disposed on the back plate 90 is a set of four return block mounts 130. Upper and lower return blocks 132 are pivotably mounted in the mounts 130. Each return block 132 includes a pair of pins 134 that extend through openings in the mounts 130 such that the return blocks 132 can be pivoted about the pins 134. Each of the return blocks 132 include a follower 136. As will be described in more detail later, each follower 136 interacts with the knob assembly 14 as it is rotated that forces the followers 136 up and down in a barrel cam configuration and cause the return blocks 132 to pivot about the pins 134. Each return block 132 further includes a pair of drivers 138 that interact with the eccentric cams 128. When the followers 136 are forced down toward the back plate 90 by the knob assembly 14, the drivers 138 are pivoted up to bear against the eccentric cams 128, thereby forcing the rotation of the rotatable dials 24 such that the number "0" is displayed through the openings 26.

A pair of lock plates 140 are disposed on posts 142 of the back plate 90, and a spring plate 144 is disposed in recesses 146 of the back plate 90. The lock plates 140 each include a lock block 148. As will be described more fully, the knob assembly 14 includes a lock bar 150, and when the lock assembly 10 is in the locked position, the lock blocks 148 abut the ends of the lock bar 150 and prevent rotation of the knob assembly 14. The lock blocks 148 also include return ramps 152 which allow the user to rotate the knob assembly 14 in the counterclockwise direction, and the lock bar 150 rides up the return ramps 152 as it is rotated, and then drops back down behind the lock blocks 148 to the locked position.

The lock plates 140 further each include a spring tab 154, and the spring plate 144 includes a pair of leaf springs 156 which bear against the spring tabs 154 and bias the lock plates 140 up and away from the back plate 90. Also disposed on each lock plate 140 is a pair of bearing faces 158 and each bearing face 158 includes a ridge 160. The circular outer surface 112 of the toggle plates 110 typically bear against the bearing faces 158 and force the lock plates 140 down toward the back plate 90. When the rotatable dials 24 are all in their predetermined unlocking position, the flat surfaces 114 of the toggle plates 110 are all face the bearing face 158, which allows the lock plates 140 to be pushed up and away from the back plate 90 by the leaf springs 156. Further, when the side plates 96 are shifted outwardly from middle axis X, the toggle plate springs 120 push the toggle plates 110 away from middle axis X, and the notches 116 of the toggle plates 110 then slide onto the ridges 160. In this position the toggle plates 110 are positively maintained, and they are displaced from the rotated dials 24, which may be rotated independently from the toggle plates 110.

The spring plate 144 includes a four dial springs 162. Each dial spring 162 bears against the back side of one of the rotatable dials 24 and specifically against the number opposite the number showing in the opening 26. The surface of each rotatable dial 24 for each number is substantially flat, and so the dial springs 162 bear against flat surfaces, causing each number to 'click' into place as the user rotates the rotatable dials 24. The spring plate 144 includes two stands 164 that set the spring plate 144 a distance up and away from the back plate 90. It further includes two locator tabs 165 that help to locate the position of the spring plate 144 relative to the back plate 90. The back plate 90 may be mounted to the outer housing 12 via four screws 166.

Figure 8:
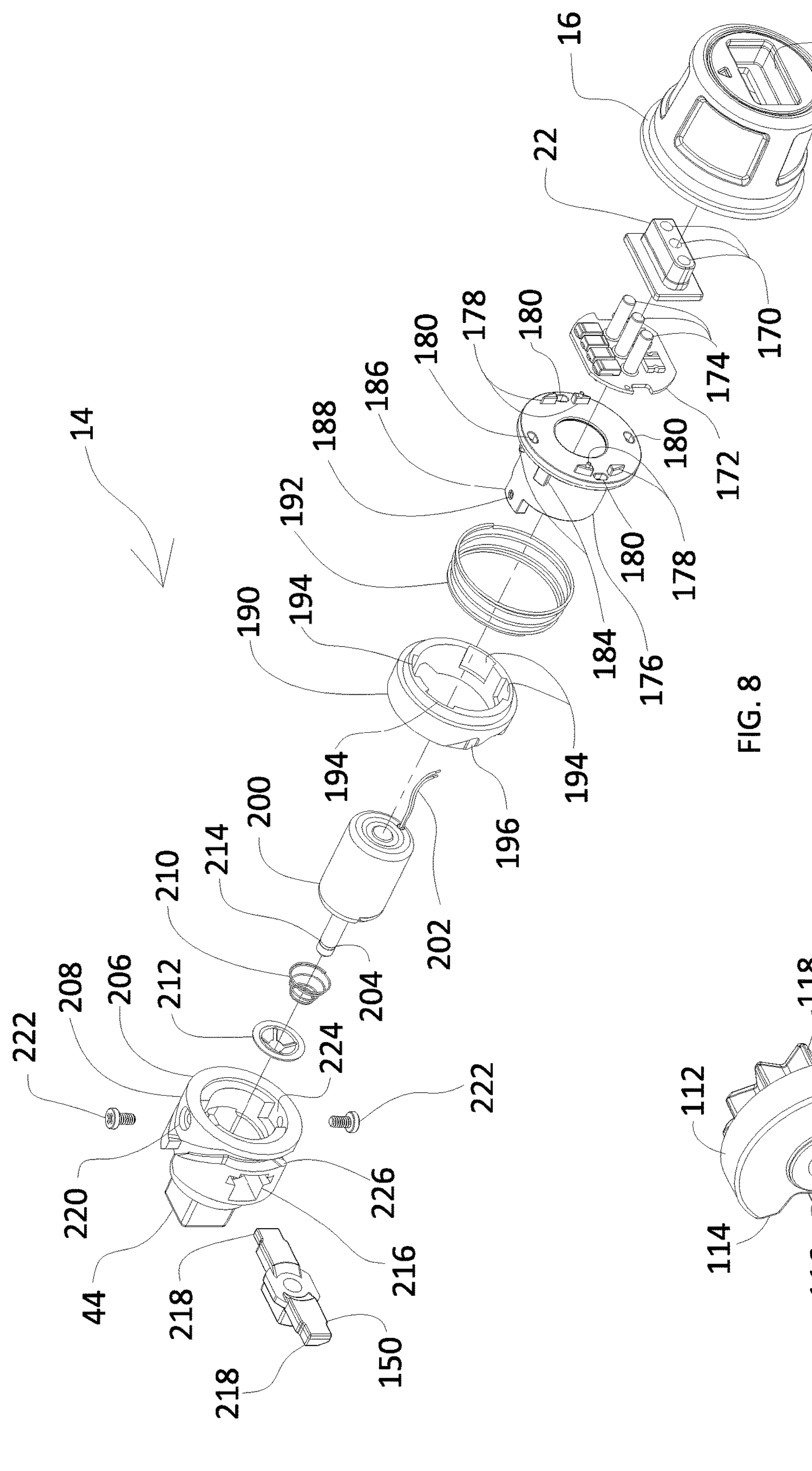
FIG. 8 is a front perspective exploded view of a knob assembly depicted in FIG. 7.
Figure 9:
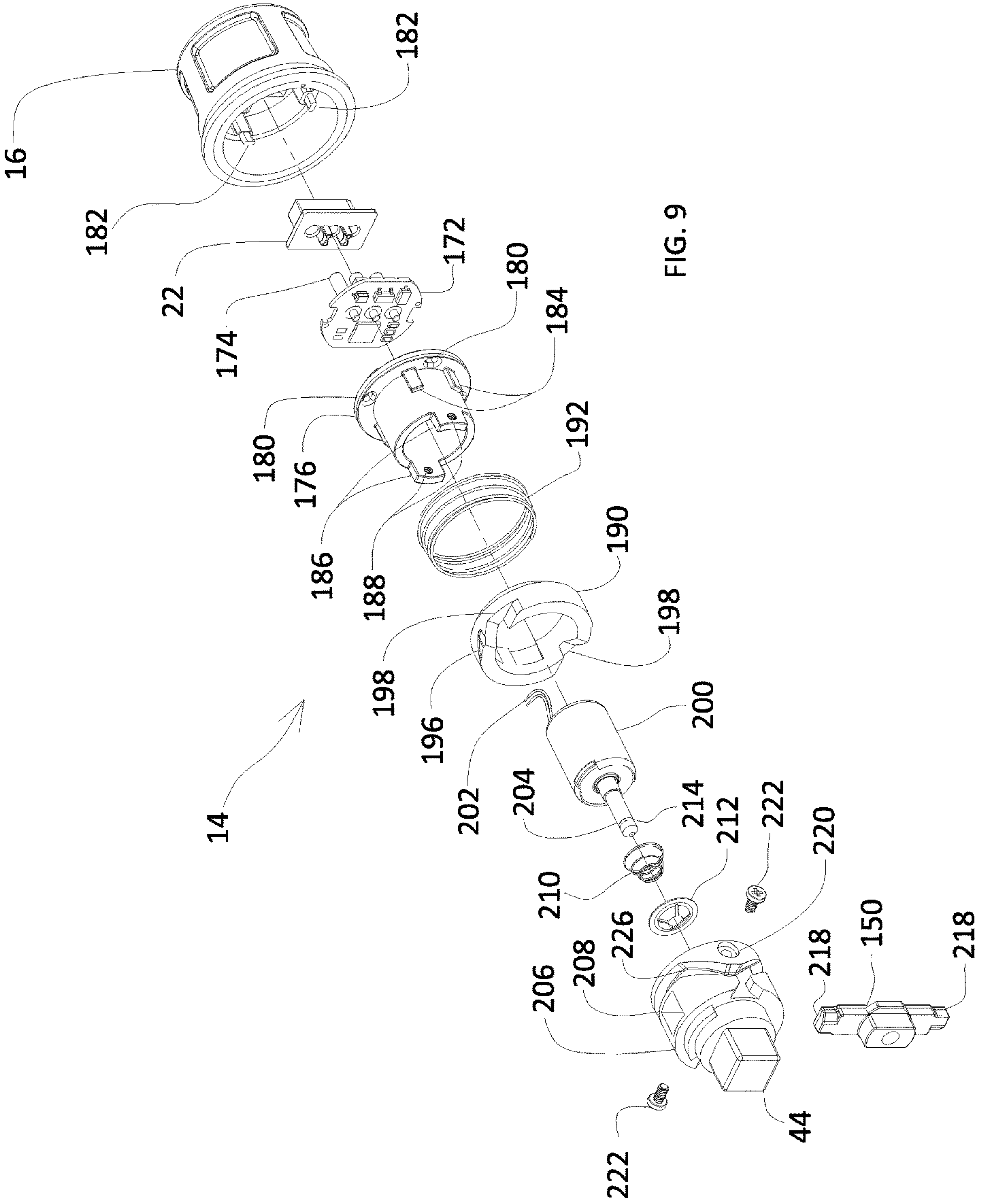
FIG. 9 is rear perspective exploded view of the knob assembly of FIG. 8.

Referring now to FIGS. 8 and 9, exploded views of the knob assembly 14 are shown. Disposed within the knob housing 16 and accessible through the knob opening 20 is the port 22 with port openings 170. Under the port 22 is a circuit board 172 having contacts 174 that extend through the port openings 170. Also disposed on the circuit board 172 are, e.g., one or more processors and memory. The contacts 174 may receive data and power from an electronic key employed by an end user and can transmit them to the circuit board 172.

The circuit board 172 is mounted to a cap 176. The cap 176 includes posts 178 and openings 180. The circuit board 172 is mounted on the posts 178. The knob housing 16 includes internal pins 182 (shown in FIG. 9) that extend downwardly and engage the openings 180 on the cap 172 to affix the cap 176 to the knob housing 16 such that rotation of the knob housing 16 causes rotation of the cap 176. The cap 176 includes two pair of tabs 184 extending downwardly as well as two fingers 186 extending downwardly, and each finger 186 includes a threaded hole 188.

Disposed beneath the cap 176 is a control ring 190 that is biased away from the cap 176 by a cap spring 192. The control ring 190 includes two pair of slots 194 that receive the tabs 184 of the cap 176 which transmit rotation of the cap 176 to the control ring 190. As will be seen, the tabs 184 of the cap 176 are slightly narrower than the slots 194 of the control ring 190, such that when rotating from the latched position to the unlatched position, the knob housing 16 will rotate slightly before rotating the control ring 190. The control ring 190 further includes a pair of recessed ramps 196 and a pair of angled slots 198 that cooperate with the lugs 100 of the side plates 96 during operation which allow the side plates 96 to shift toward and away from middle axis X, as will be discussed in more detail.

An electronically operated linear solenoid actuator 200 includes a wire 202 soldered to the circuit board 172 and is in communication with the circuit board 172. The actuator 200 includes a shaft 204 that translates linearly in and out.

Finally, the knob assembly 14 includes a drive module 206 having a cylinder 208 and the drive shaft 44. Disposed within the cylinder 208 is the lock bar 150, a lock bar spring 210, and a clip 212 disposed on a circumferential recess 214 in the actuator shaft 204. The lock bar 150 is disposed on the actuator shaft 204 in between the clip 212 and the spring 210, and the spring 210 biases the lock bar 150 down, away from the knob housing 16. The lock bar 150 is shiftable between two positions toward and away from the knob housing 16. For assembly, the lock bar 150 is inserted laterally into the cylinder 208 through entry hole 216. The lock bar 150 includes exterior portions 218 that, as can be best seen in FIG. 7, extend outside of the cylinder 208.

The cylinder 206 further includes a pair of recessed through holes 220, a pair of screws 222, and a pair of slots 224. The fingers 186 of the cap 176 are disposed in the slots 224, and the screws 222 are screwed into the threaded holes 188 of the cap 176 to secure the cap 176 to the drive module 206. A groove forming a barrel cam slot 226 is disposed on the outer surface of the cylinder 208, and the followers 136 of the return block 132 are disposed in the cam slot 226. As the cylinder 208 is rotated, the followers 136 track within the cam slot 226 and are displaced towards and away from the knob housing 16. As mentioned earlier, this results in the pivoting of the return blocks 132 about the pins 134.

Figure 10:
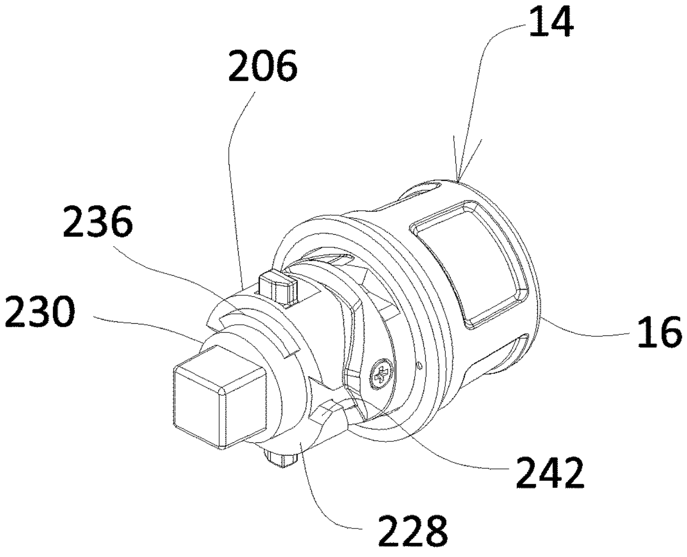
FIG. 10 is a rear perspective detail view the knob assembly of FIG. 8 as assembled.
Figure 11:
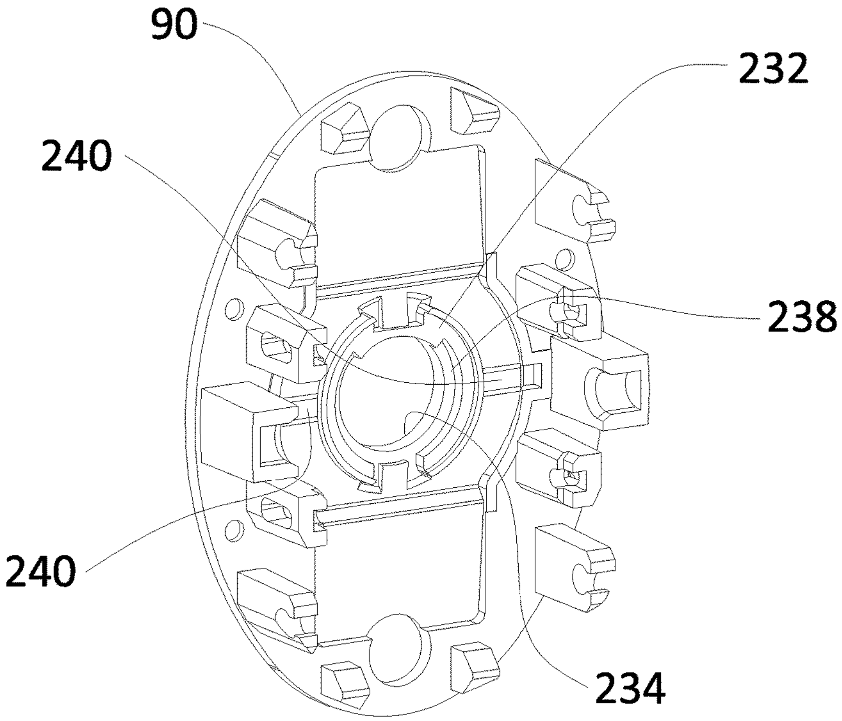
FIG. 11 is a detail perspective view of a back plate of the lock assembly of FIG. 1.

Referring now specifically to FIGS. 10 and 11, the knob assembly 14 and a detail view of the back plate 90 is shown. The drive module 206 includes a knob bearing face 228 and drive cylinder 230. The back plate 90 includes a support face 232 and circular opening 234. When assembled, the bearing face 228 bears on the support face 232 to capture the knob assembly 14 within the outer housing 12, and the drive cylinder 230 extends through the circular opening 234. The knob assembly 14 further includes a stopper 236, and the back plate 90 include a stopper slot 238. The action of the stopper 236 sliding within the stopper slot 238 limits the rotation of the knob assembly 16 to approximately 180° of rotation between the latched position and the unlatched position. The back plate 90 further includes a pair of locator recesses 240 in which the locator tabs 165 of the spring plate 144 are disposed to help locate the spring plate 144. The knob bearing face 228 of the knob assembly 14 further includes a pair of ramped gaps 242 on opposite sides. When the knob assembly 14 is in the latched position and the unlatched position, the ramped gaps 242 of the bearing face 228 are disposed over the stands 164 of the spring plate 144, allowing the spring plate 144 to rise, which causes the dial springs 162 to bear on the rotatable dials 24. When the knob assembly 14 is turned between the latched position and unlatched position, the bearing face 228 pushes down on the stands 164, thereby pushing the dial springs 162 away from the dials 24, which allows the rotatable dials 24 to rotate freely.

Referring now to FIGS. 12-15*a*, the knob assembly 14 is in a position where the arrow 50 is pointing toward the unlocked symbol 54, corresponding to the unlatched position, e.g. the position where the deadbolt 48 is retracted into the deadbolt housing 34 (see, e.g., FIGS. 3 and 4), or the cam latch 62 is oriented horizontally, and the user is able to open and close the panel 32 to which the lock 30 is attached.

Figure 12:
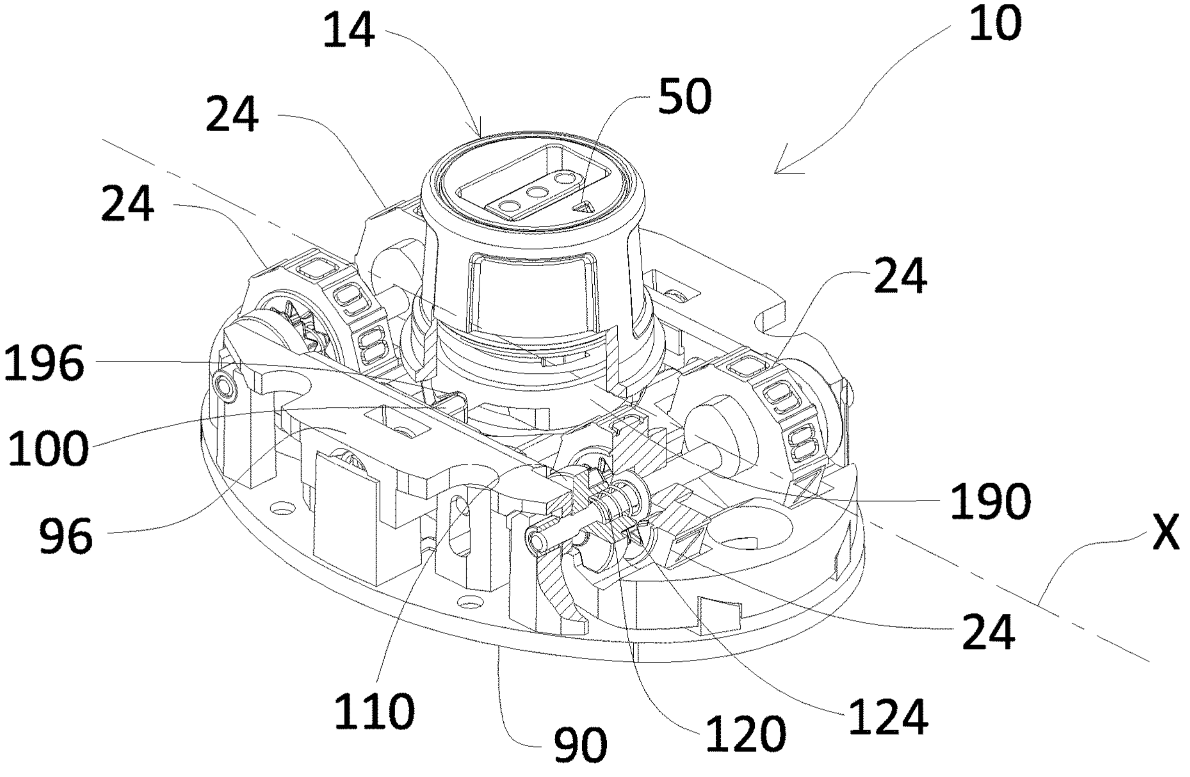
FIG. 12 a perspective view of the lock assembly of FIG. 1, with an outer housing removed, in partial section view, and with the lock assembly in the unlocked, unlatched position.

In the unlatched position shown in FIG. 12, the rotatable dials 24 sit in position 0-0-0-0. The lugs 100 sit in the recessed ramps 196 of the control ring 190, thus forcing the side plates 96 away from middle axis X. This allows toggle plate springs 120 to push the toggle plates 110 away from middle axis X, and to a position where the toggle plates 110 are disengaged from the ring gears 124 of the rotatable dials 24.

Figure 13:
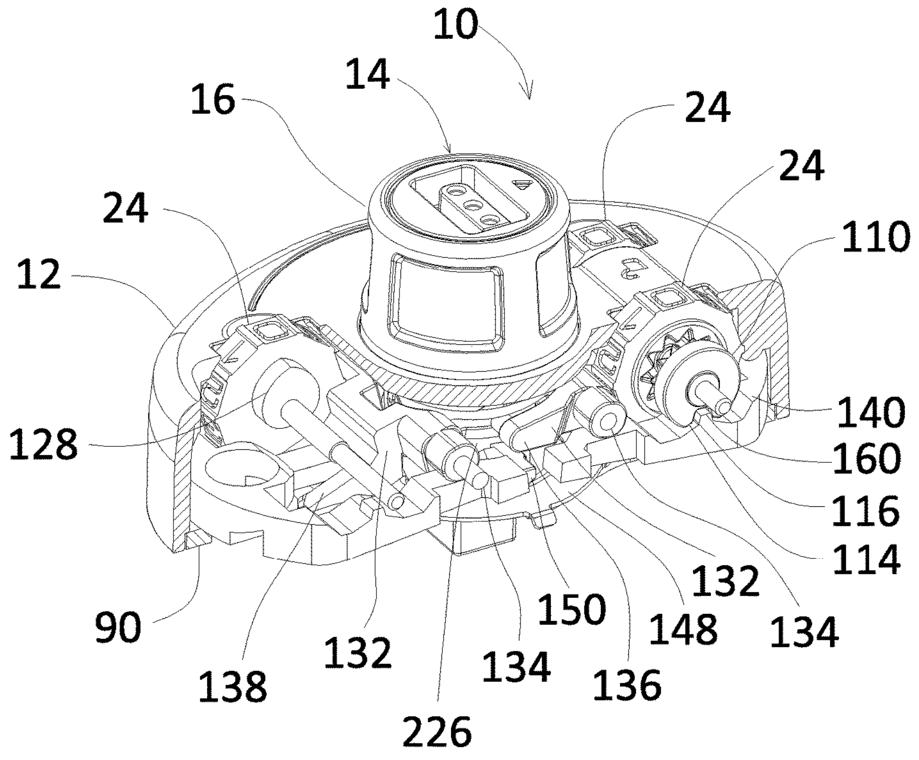
FIG. 13 is a perspective view of the lock assembly of FIG. 1, with the outer housing and back plate in section view and certain elements removed for clarity, in the same position as shown in FIG. 12.
Figure 13A:
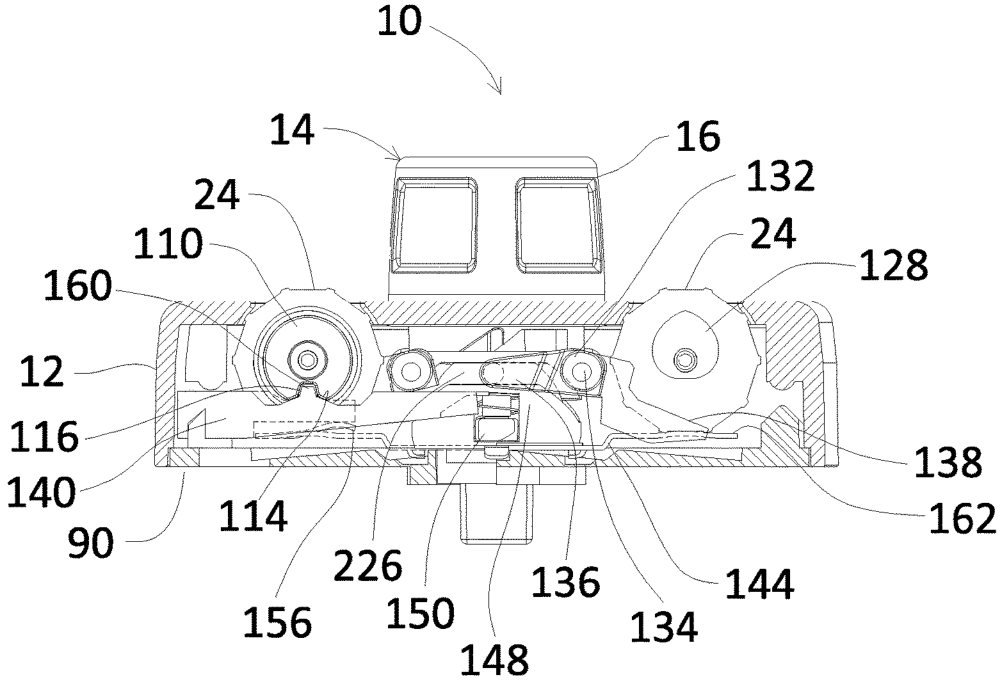
FIG. 13*a* is a side view of the lock assembly as depicted in FIG. 13.

Referring specifically to FIGS. 13 and 13*a*, the lock assembly 10 is shown with the outer housing 12 and the back plate 90 in section, and with one of the rotatable dials 24 and toggle plates 110 removed for clarity. The followers 136 of the return block 132 are disposed in the cam slots 226 of the drive module 206. In this position, the followers 136 are disposed toward the knob housing 16, thus pivoting the drivers 138 about the pins 134 down from the eccentric cams 128. Moreover, the toggle plates 110 are all oriented with their flat surfaces 114 and notches 116 toward the back plate 90, such that the notches 116 of the toggle plates 110 are disposed within the ridges 160 of the lock plate 140. This prevents the toggle plates 110 from rotating. Because the flat surfaces 114 bear against the lock plates 140, the lock springs 156 of the spring plate 144 press against the spring tabs 154 of the lock plates 140 and press the lock plates 140 up toward the knob housing 16. In this manner, the lock blocks 148 are shifted toward the knob housing 16 to an unlocked position and do not impede the rotation of the lock bar 150, and the user is able to rotate the knob assembly 14.

Figure 14:
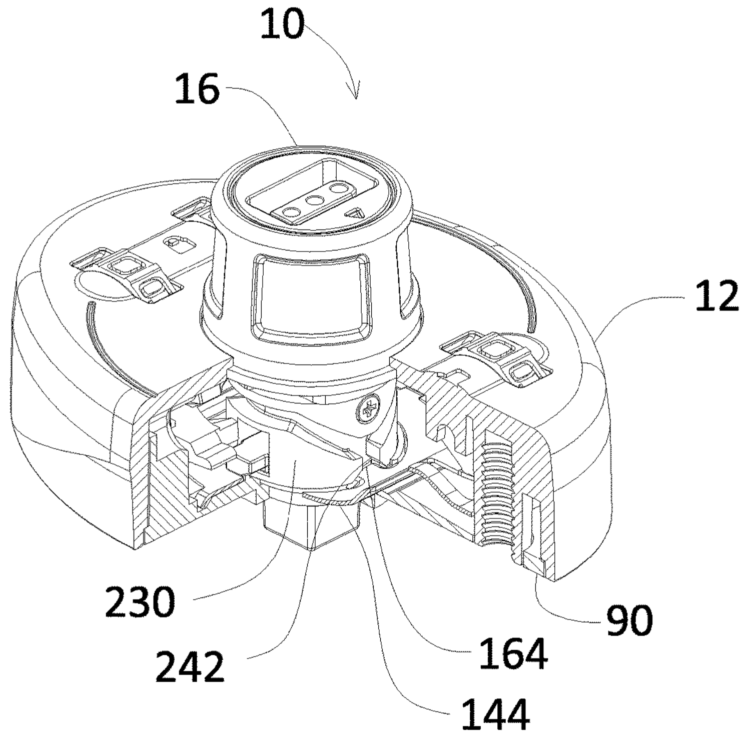
FIG. 14 is a perspective view of the lock assembly of FIG. 1 with the outer housing, back plate, and spring plate in section view and certain elements removed for clarity, in the same position as shown in FIG. 12.
Figure 14A:
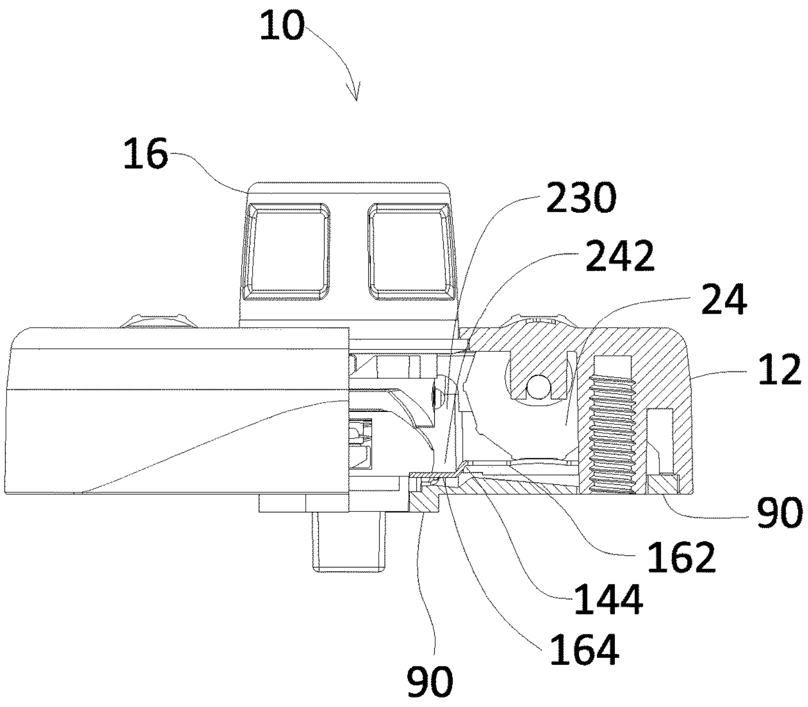
FIG. 14*a* is a side view of the lock assembly as depicted in FIG. 14.

In this position, the stands 164 of the spring plate 144 are disposed under the gaps 242 of the drive cylinder 230. See FIGS. 14 and 14*a*. The spring plates 144 rise toward the knob housing 16, and the dial springs 162 bear against the rotatable dials 24 to "click" them into place as they rotate such that a selected number is visible within the opening 26.

Figure 15:
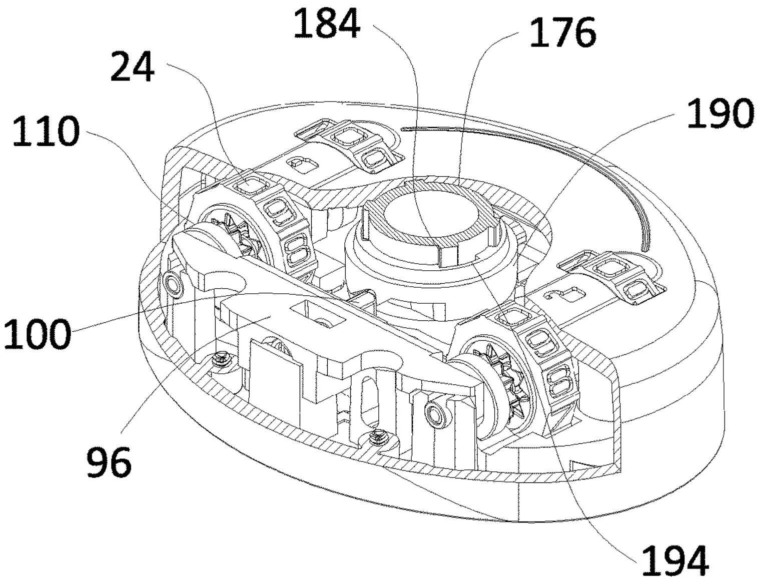
FIG. 15 is a perspective view of the lock assembly of FIG. 1, with the outer housing and knob assembly in section view and certain elements removed for clarity, in the same position as shown in FIG. 12.
Figure 15A:
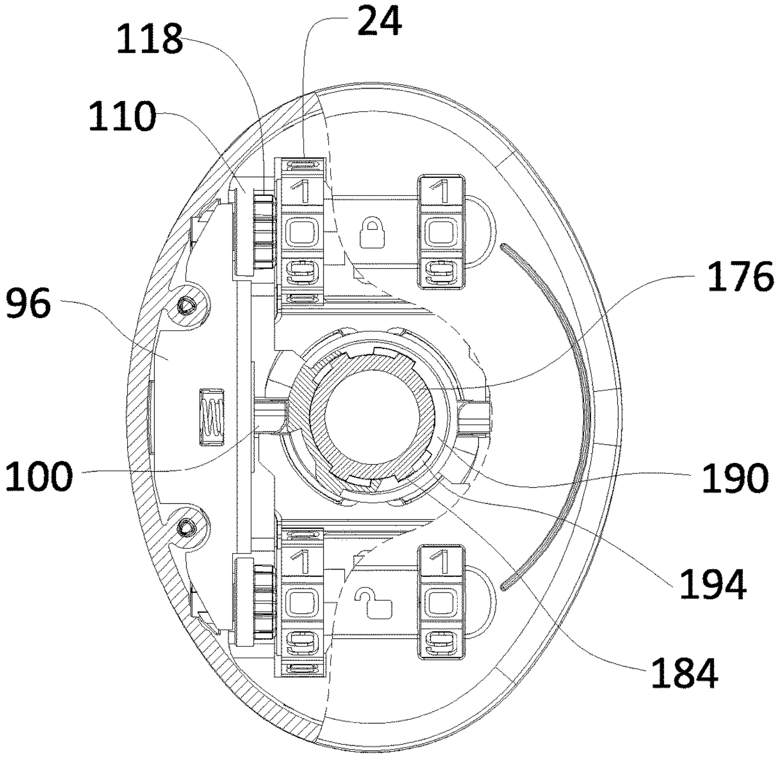
FIG. 15*a* is a front view of the lock assembly as depicted in FIG. 15.
Figure 16:
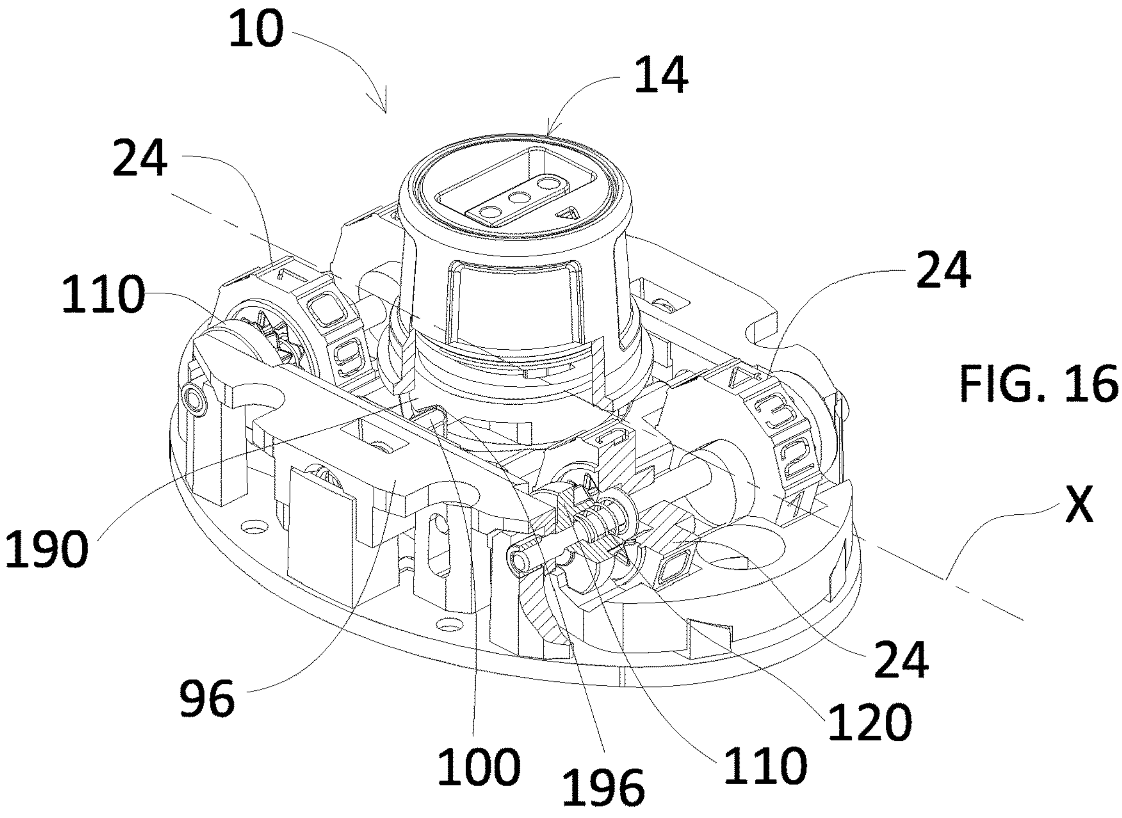
FIG. 16 a perspective view of the lock assembly of FIG. 1, with an outer housing removed, in partial section view, and with the lock in the unlocked, unlatched position, but with a new unlocking code entered on rotatable dials.
Figure 17:
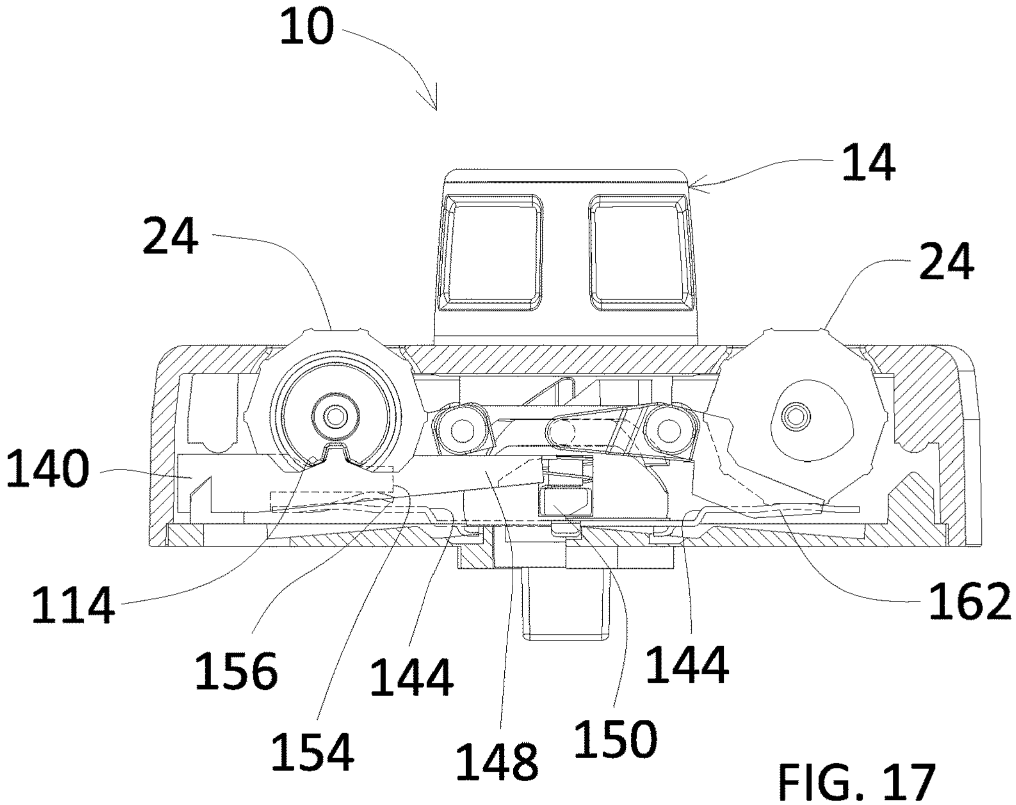
FIG. 17 is a side view of the lock assembly of FIG. 1, with the outer housing and back plate in section view and certain elements removed for clarity, in the same position as shown in FIG. 16.
Figure 18:
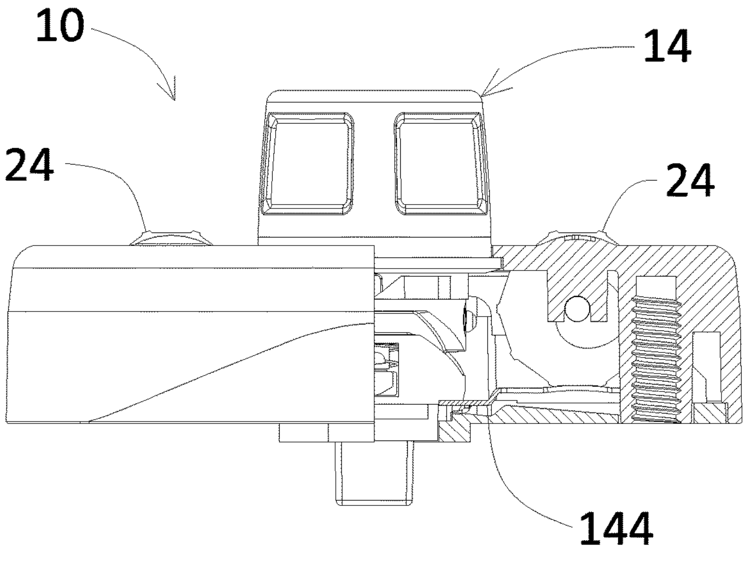
FIG. 18 is a side view of the lock assembly of FIG. 1, with the outer housing, back plate, spring plate, and knob assembly in section view and certain elements removed for clarity, in the same position as shown in FIG. 16

Referring specifically to FIGS. 15 and 15*a*, the cap 176 and the control ring 190 are shown in cross section, and the tabs 184 are disposed in the slots 194. In the position shown in FIGS. 12-15, the knob assembly 14 has been rotated fully to the unlatched position. Because the slots 194 are slightly wider than the tabs 184, the knob assembly 14 may be rotated a full 180 degrees with a slightly less than 180 degree rotation of the control ring 190. An end user may be more comfortable with a full 180 degree rotation.

Figure 19:
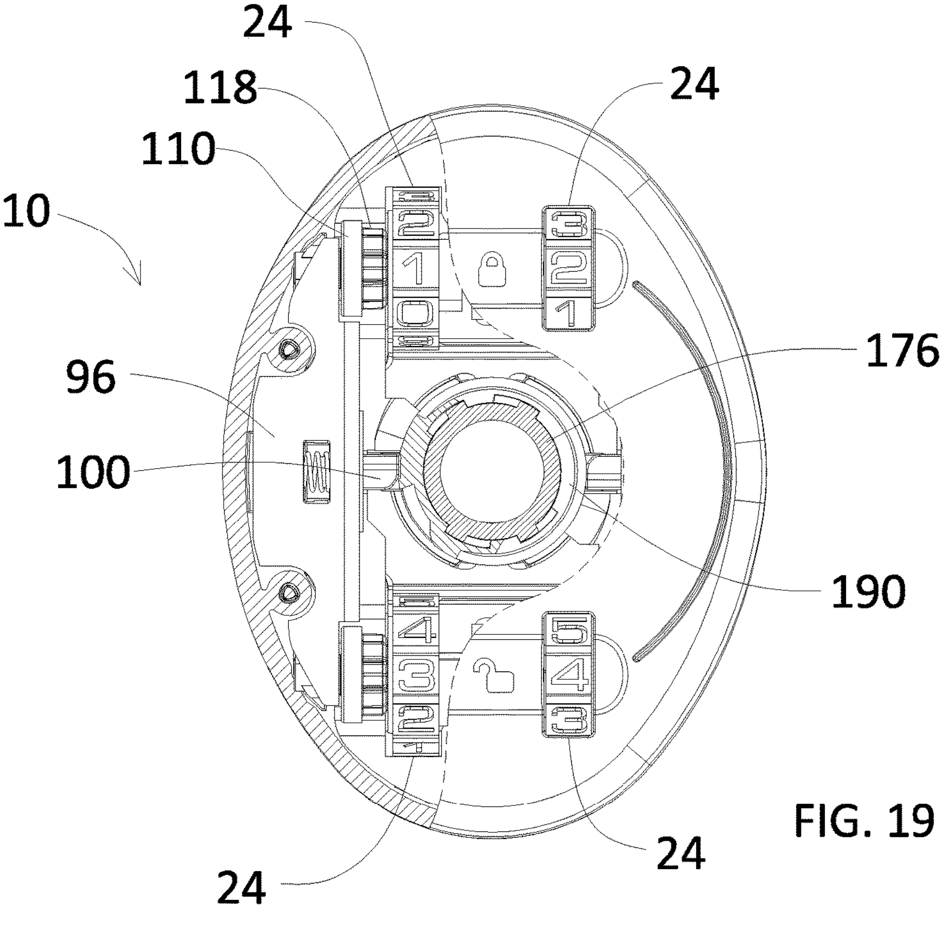
FIG. 19 is a front view of the lock assembly of FIG. 1, with the outer housing and the knob assembly in section view and certain elements removed for clarity, in the same position as shown in FIG. 16.

Referring now to FIGS. 16-19, the lock assembly 10 is shown in a subsequent position where the lock assembly 10 is still in the unlatched position, and the user has rotated the rotatable dials 24, and the eccentric cams 128 along with them, to set an unlock code. Here, as best seen in FIG. 19, the user has set the unlock code of the rotatable dials 24 to 1-2-3-4. The knob assembly 14 has not been rotated relative to the position shown in FIGS. 12-15, and so the control ring 190 continues to force the side plates 96 away from middle axis X, and the toggle springs 120 continue to force the toggle plates 110 to be disengaged from the rotatable dials 24. Accordingly, in this position, rotation of the rotatable dials 24 does not rotate the toggle plates 110.

Moreover, the toggle plates 110 continue to be in the position where the flat sides 114 face the locks plates 140, and so the lock plates 140 are forced up toward the knob assembly 14 by the lock springs 156 of the spring plates 144 bearing against the spring tabs 154 of the lock plates 140. The lock blocks 148 of the lock plate 140, therefore do not block rotation of the lock bar 150, and the spring plate 144 continues to be elevated away from the back plate 90, such that the dial springs 162 continue to bear against the rotatable dials 24, and the selected indicia are "clicked" into place when rotating the rotatable dials 24.

Figure 20:
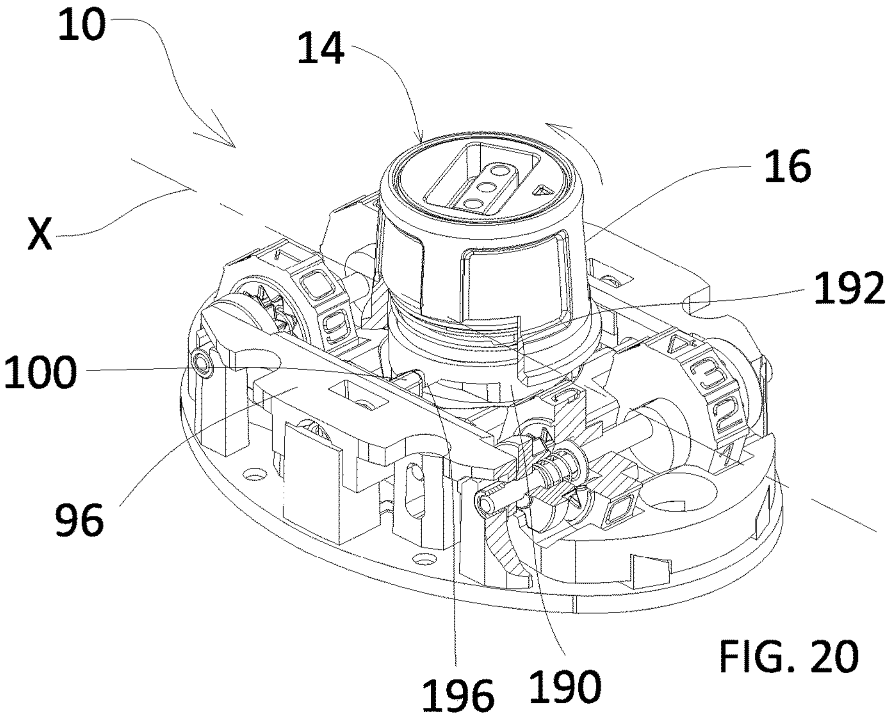
FIG. 20 a perspective view of the lock assembly of FIG. 1, with the outer housing removed, in partial section view, and with the knob assembly beginning to rotate from the unlatched position.

Referring now to FIG. 20, the user has just initiated the rotation of the knob assembly 14 in the counterclockwise direction to begin the process to shift the lock assembly 10 to the latched position. As will be understood, this initial rotation of the knob assembly 14 includes the rotation of the cap 176 The lugs 100 of the side plates 96, are disposed in the recessed ramps 196 of the control ring 190. As the user rotates the knob assembly 14, the control ring 190 is rotated, and the lugs 100 force the control ring 190 up towards the knob housing 16 due to the recessed ramps 196 riding up the lugs 100 and against the bias of the cap spring 192.

Figure 21:
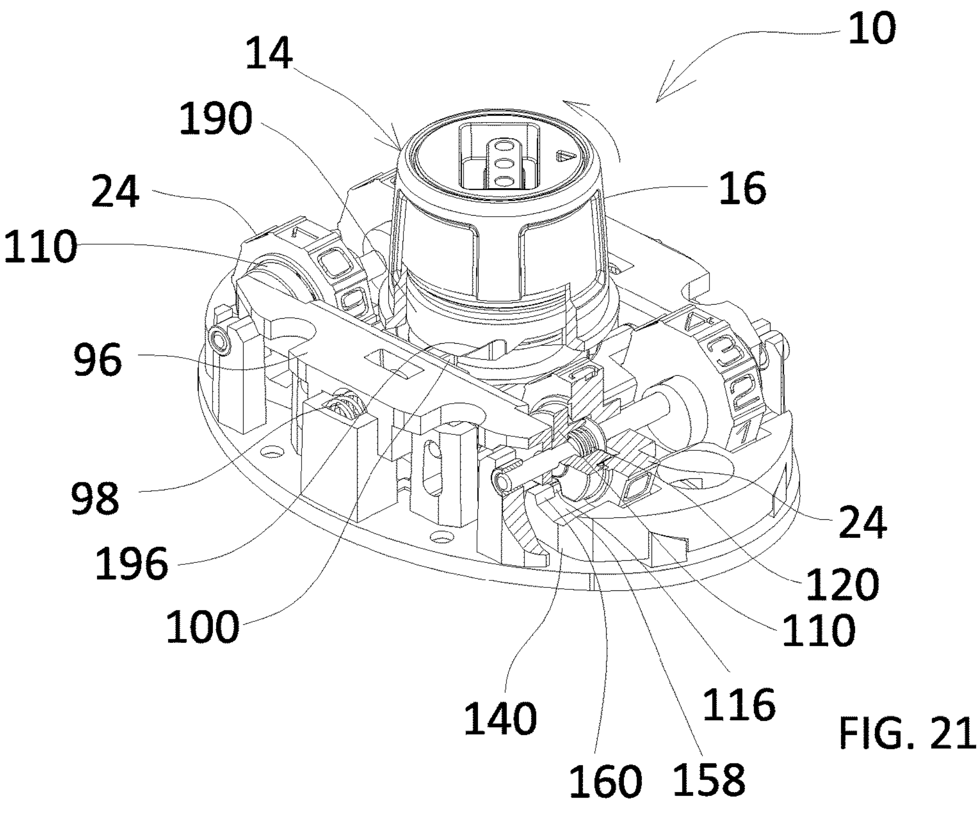
FIG. 21 is a perspective view of the lock assembly of FIG. 1, with the outer housing removed, in partial section view, and with the knob assembly rotated to a position where the toggle plates engage the rotatable dials.
Figure 22:
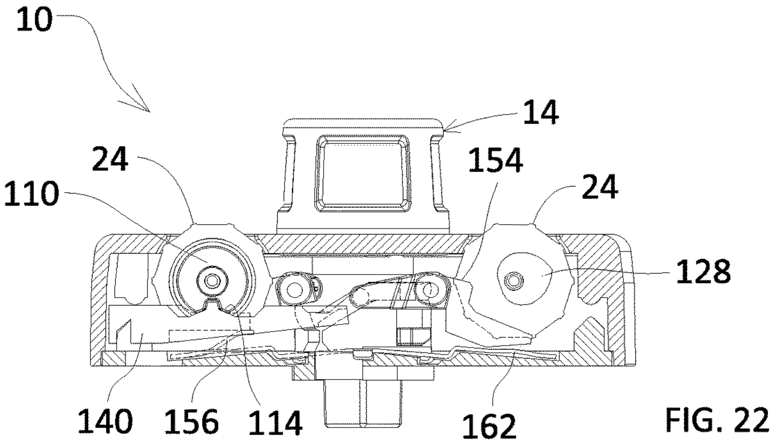
FIG. 22 is a side view of the lock assembly of FIG. 1, with the outer housing and the back plate in section view and certain elements removed for clarity, in the same position as shown in FIG. 21.
Figure 23:
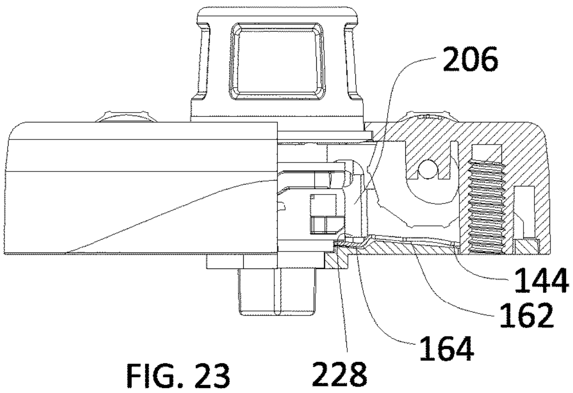
FIG. 23 is a side view of the lock assembly of FIG. 1, with the outer housing, back plate, and knob assembly in section view and certain elements removed for clarity, in the same position as shown in FIG. 21.
Figure 24:
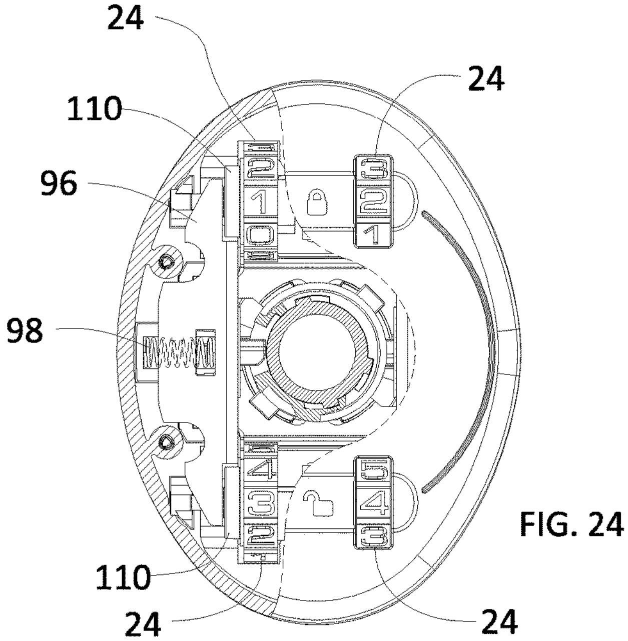
FIG. 24 is a front view of the lock assembly of FIG. 1, with the outer housing and the knob assembly in section view and certain elements removed for clarity, in the same position as shown in FIG. 21.

Referring now to FIGS. 21-24, the user has continued to rotate the knob assembly 14 in the counterclockwise direction. The ramping action of the lugs 100 in conjunction with the recess ramps 196 has caused the control ring 190 to be forced up toward the knob assembly 14 and above the lug 100. The side plates 96 and the lugs 100 then shift inward toward middle axis X underneath the control ring 190 under the force of the side plate springs 98. The side plates 96 push the toggle plates 110 toward middle axis X into engagement with the rotatable dials 24, with the spur gears 118 of the toggle plates 110 setting in the ring gears 124 of the rotatable dials 24. As best seen in FIG. 21, the notches 116 of the toggle plates 110 are no longer disposed over the ridges 160 of the lock plate 140, they have been shifted to the bearing surfaces 158, and the toggle plates 110 may therefore be rotated. In this position, the flat surfaces 114 of the toggle plates 110 still bear against the lock plate 140, such that the lock plate 140 continues to be shifted up. Because the toggle plates 110 engage with the rotatable dials 24 while the lock plate 140 is in the unlocking position, the user has set the unlocking code to be 1-2-3-4.

Here, due to the rotation of the knob assembly 14, ramped gaps 242 of the drive cylinder 230 are no longer above the stands 164 of the spring plate 144. Accordingly, the knob bearing face 228 of the drive module 230 is now pressing down on the stands 164, thereby forcing the spring plate 144 and its dial springs 162 away from the rotatable dials 24 and toward the back plate 90, and thereby allowing the rotatable dials 24 to rotate freely. The spring tabs 156, however, continue to bias the lock plates 140 up toward the knob assembly 14, however, due to their configuration.

FIGS. 25-28 depict the scrambling function of the lock assembly 10. As the knob assembly 14 continues to be rotated in the counterclockwise direction, the cam slot 226 of the drive module 206 directs the followers 136 of the return blocks 132 down toward the back plate 90. The return blocks 132 pivot about their pins 134, causing the drivers 138 to shift in a direction up and away from the back panel 90 and against the eccentric cams 128 of the rotatable dials 24, thereby rotating each of the rotatable dials 24 into the 0-0-0-0 position and scrambling the rotatable dials away from the unlocking code to the generic 'all zeros' position.

Rotation of the rotatable dials 24 here also rotates the toggles plates 110 such that the flat surfaces 114 no longer bear on the bearing faces 158 of the lock plates 140. Instead, the circular outer surface 112 of the toggle plates 110 bear on the bearing faces 158, thereby forcing the lock plates down toward the back plate 90 against the force of the spring plate 144 and into the locking position.

Referring now to FIGS. 29-32, the knob assembly 14 has been rotated a full 180° counterclockwise into the locked and latched position. The control ring 190 has been rotated to and past a position where the angled slots 198 are directly up above the lugs 100 (in the orientation of FIG. 29) of the side plates 96. The cap spring 192 forces the control ring 190 to drop down toward the back plate 90, and the lugs 100 are disposed within the angled slots 198 of the control ring 190. The cam slots 226 have directed the followers 136 of the return blocks 132 back away from the back panel 90 and the drivers 138 are again spaced from the eccentric cams 128.

Figure 25:
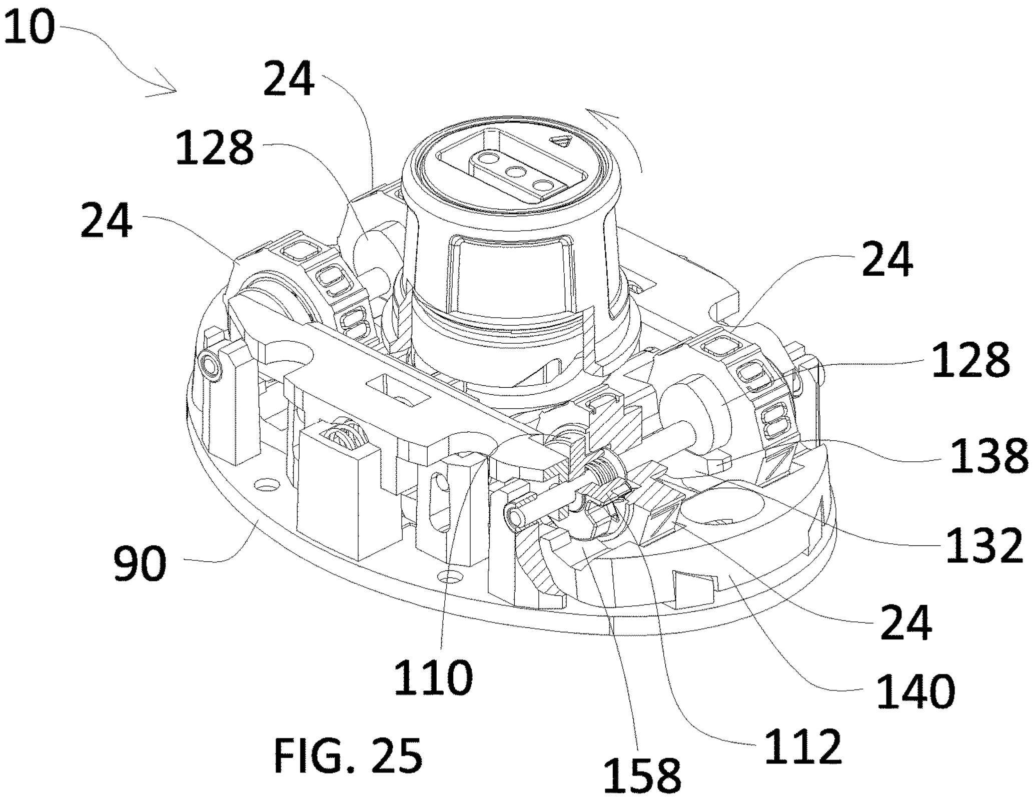
FIG. 25 is a perspective view of the lock assembly of FIG. 1, with the outer housing removed, in partial section view, and with the knob assembly rotated to a position where the rotatable dials have been scrambled and the lock assembly is placed in the locked position.
Figure 26:
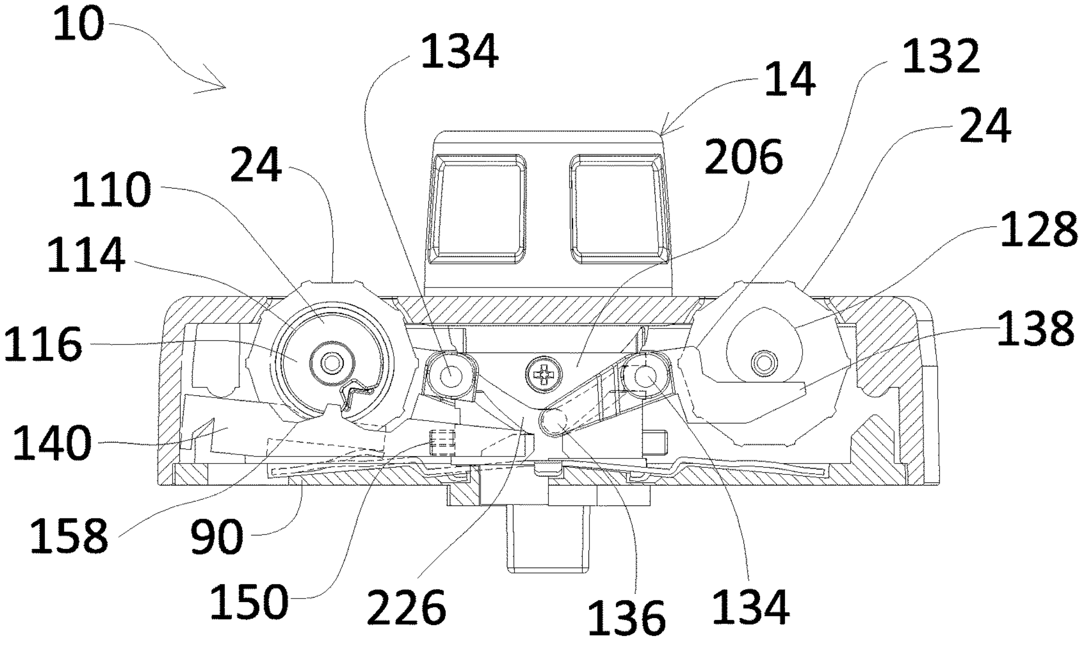
FIG. 26 is a side view of the lock assembly of FIG. 1, with the outer housing and back plate in section view and certain elements removed for clarity, in the same position as shown in FIG. 25.
Figure 27:
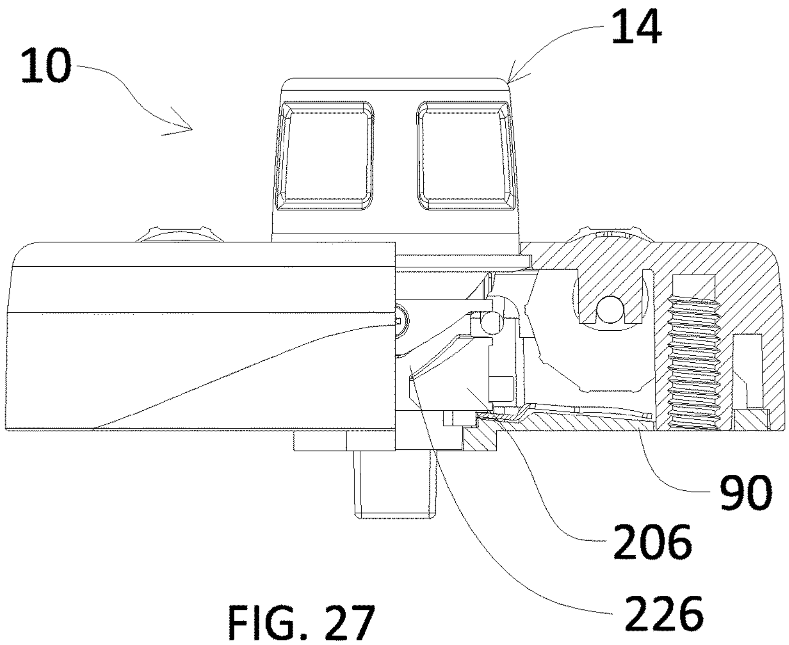
FIG. 27 is a side view of the lock assembly of FIG. 1, with the outer housing, back plate, and knob assembly in section view and certain elements removed for clarity, in the same position as shown in FIG. 25.
Figure 28:
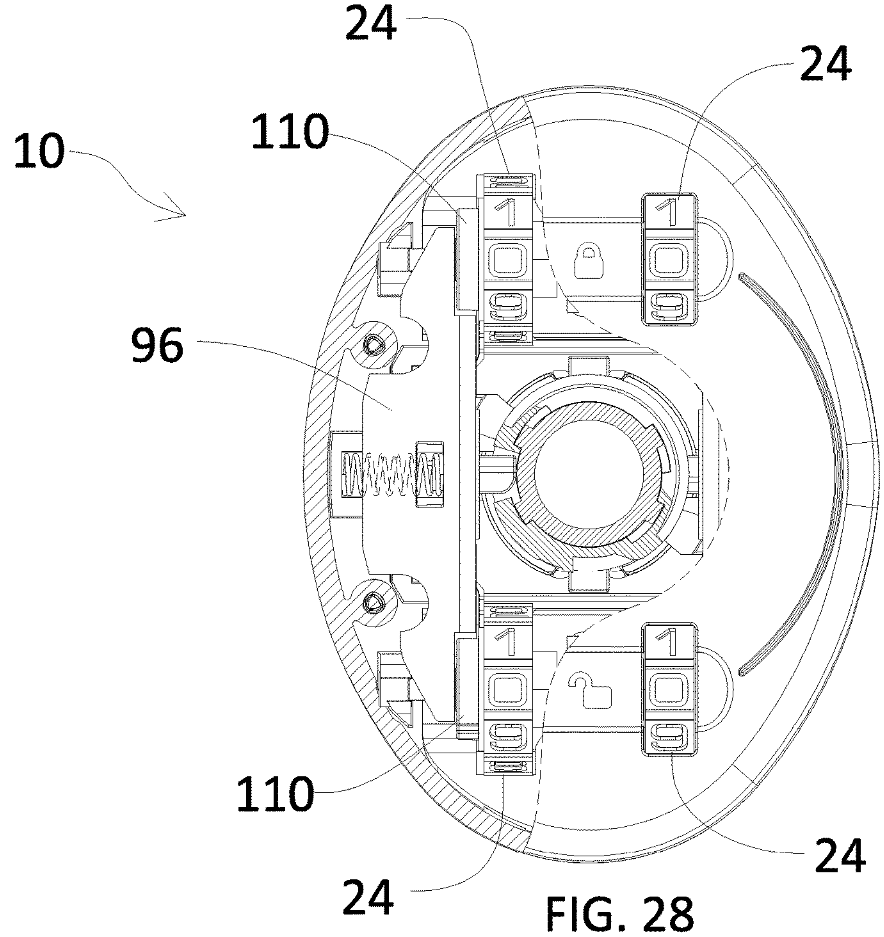
FIG. 28 is a front view of the lock assembly of FIG. 1, with the outer housing and the knob assembly in section view and certain elements removed for clarity, in the same position as shown in FIG. 25.
Figure 29:
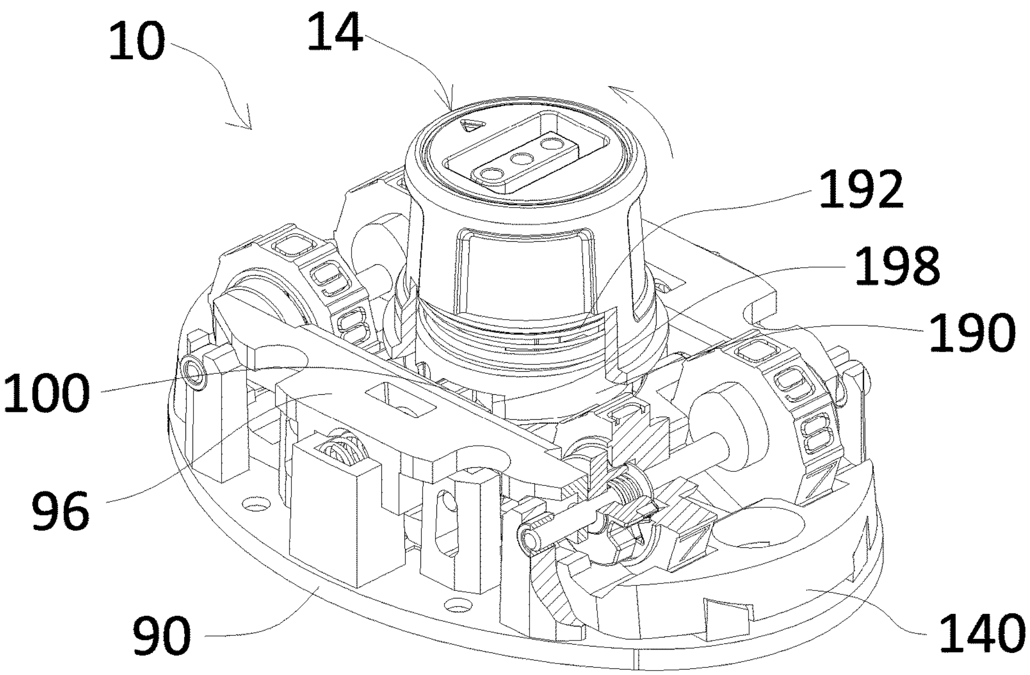
FIG. 29 is a perspective view of the lock assembly of FIG. 1, with the outer housing removed, in partial section view, and with the knob assembly rotated to the locked and latched position.
Figure 30:
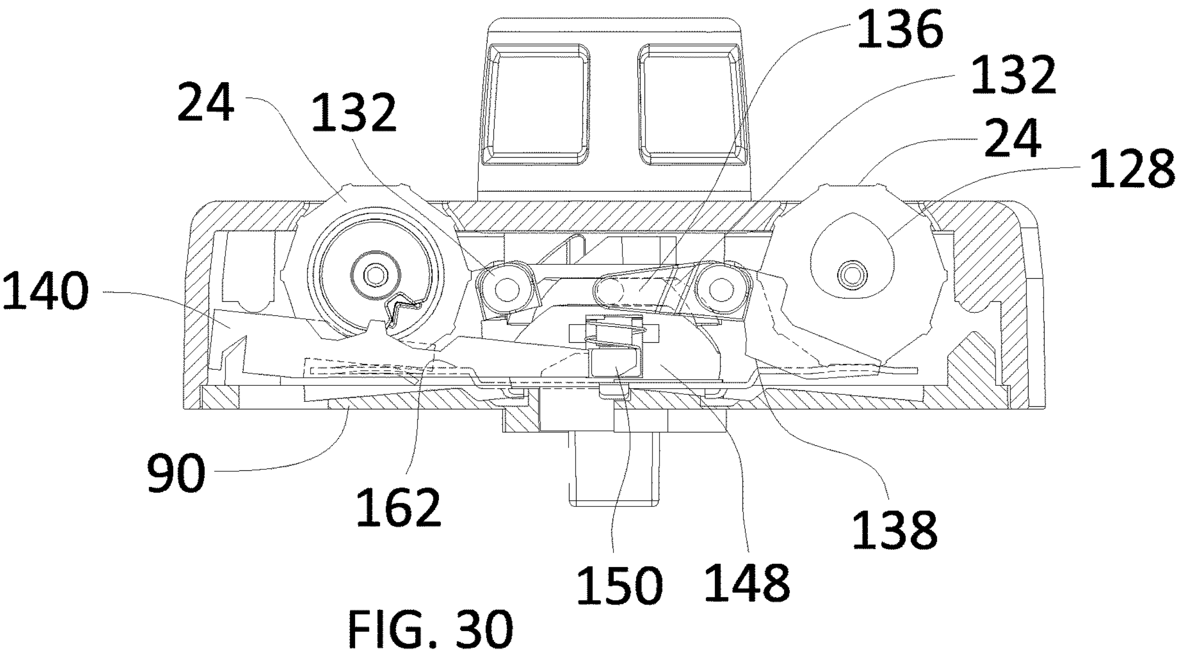
FIG. 30 is a side view of the lock assembly of FIG. 1, with the outer housing and back plate in section view and certain elements removed for clarity, in the same position as shown in FIG. 29.
Figure 31:
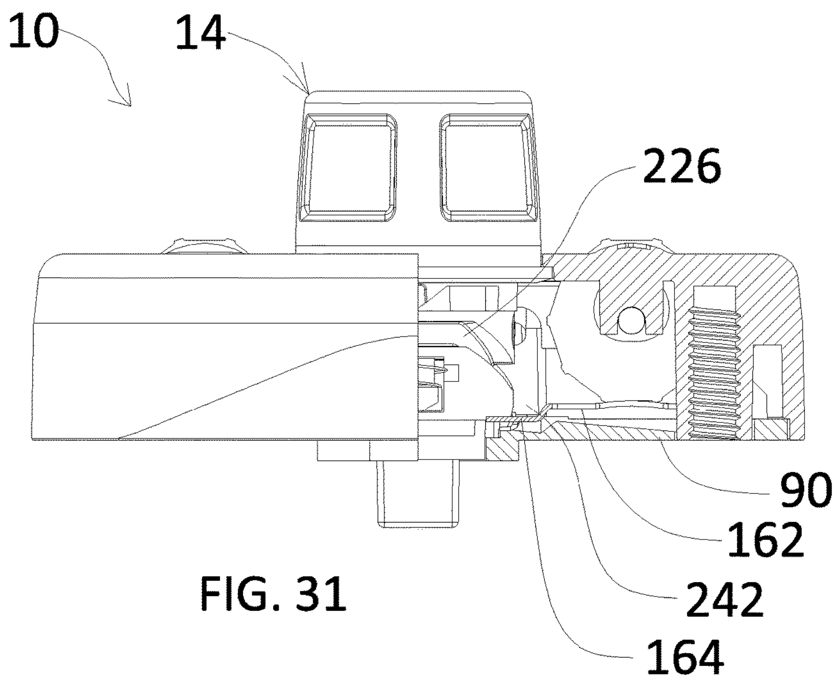
FIG. 31 is a side view of the lock assembly of FIG. 1, with the outer housing, back plate, and knob assembly in section view and certain elements removed for clarity, in the same position as shown in FIG. 29.
Figure 32:
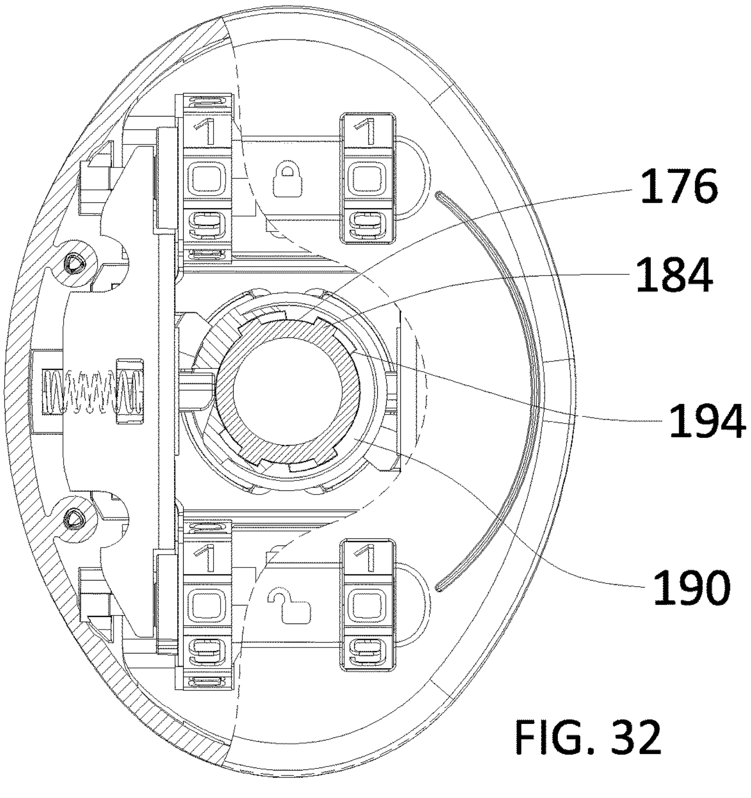
FIG. 32 is a front view of the lock assembly of FIG. 1, with the outer housing and the knob assembly in section view and certain elements removed for clarity, in the same position as shown in FIG. 29.
Figure 33:
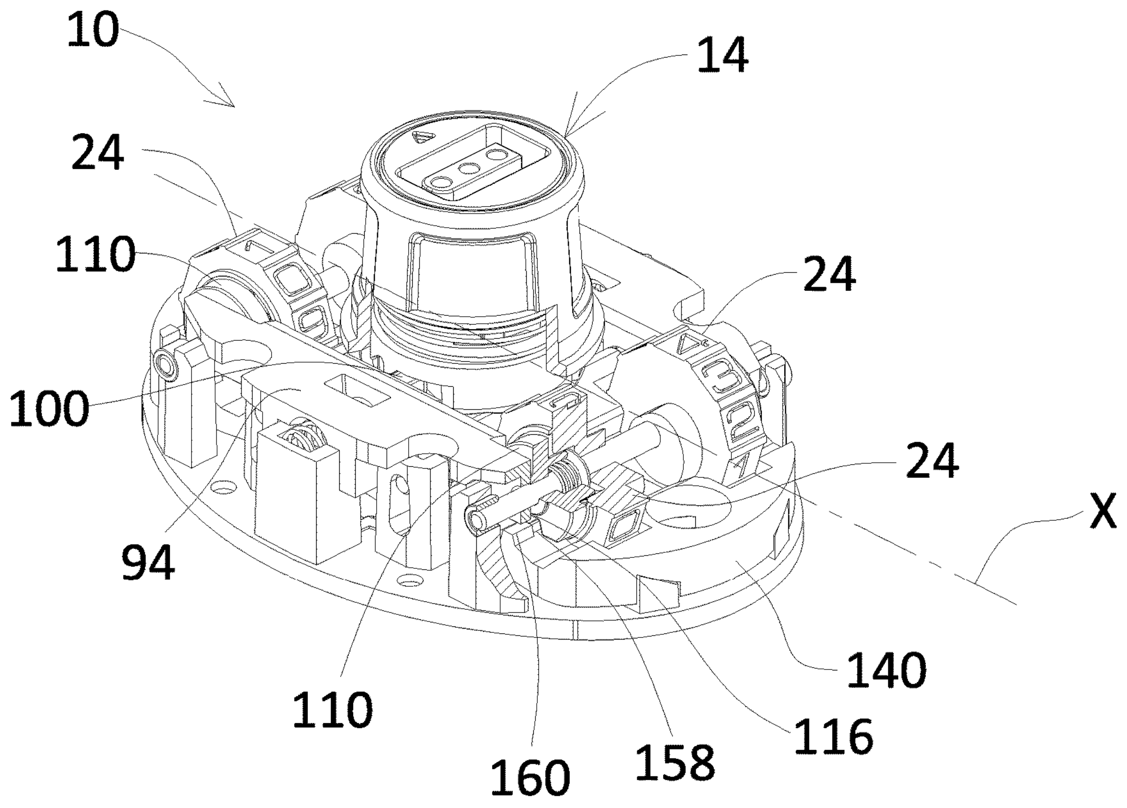
FIG. 33 is a perspective view of the lock assembly of FIG. 1, with the outer housing removed, in partial section view, and with the rotatable dials rotated to the unlocking code to place the lock assembly in the unlocked position.
Figure 34:
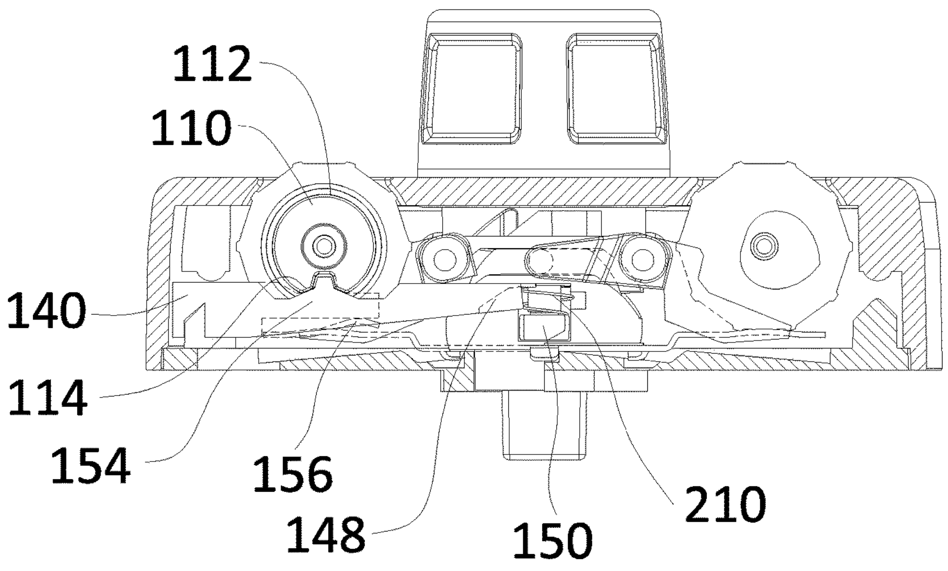
FIG. 34 is a side view of the lock assembly of FIG. 1, with the outer housing and back plate in section view and certain elements removed for clarity, in the same position as shown in FIG. 23.
Figure 35:
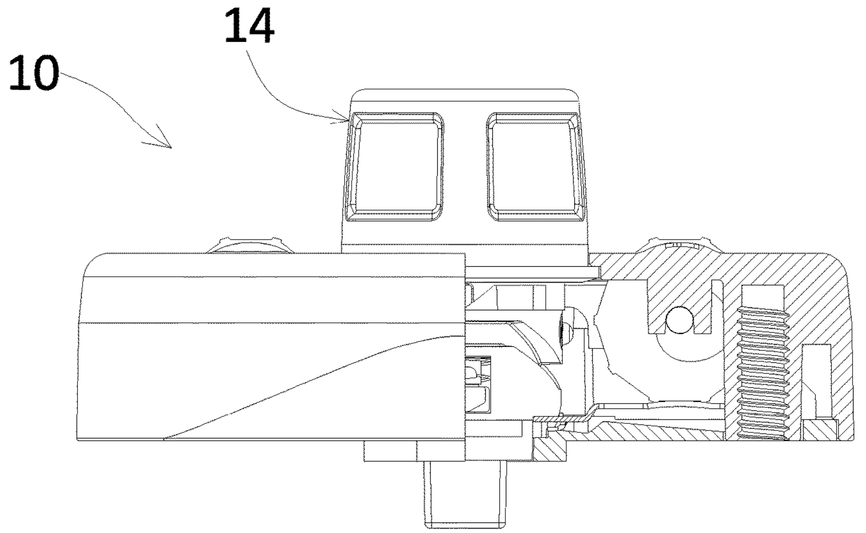
FIG. 35 is a side view of the lock assembly of FIG. 1, with the outer housing, back plate, and knob assembly in section view and certain elements removed for clarity, in the same position as shown in FIG. 33.
Figure 36:
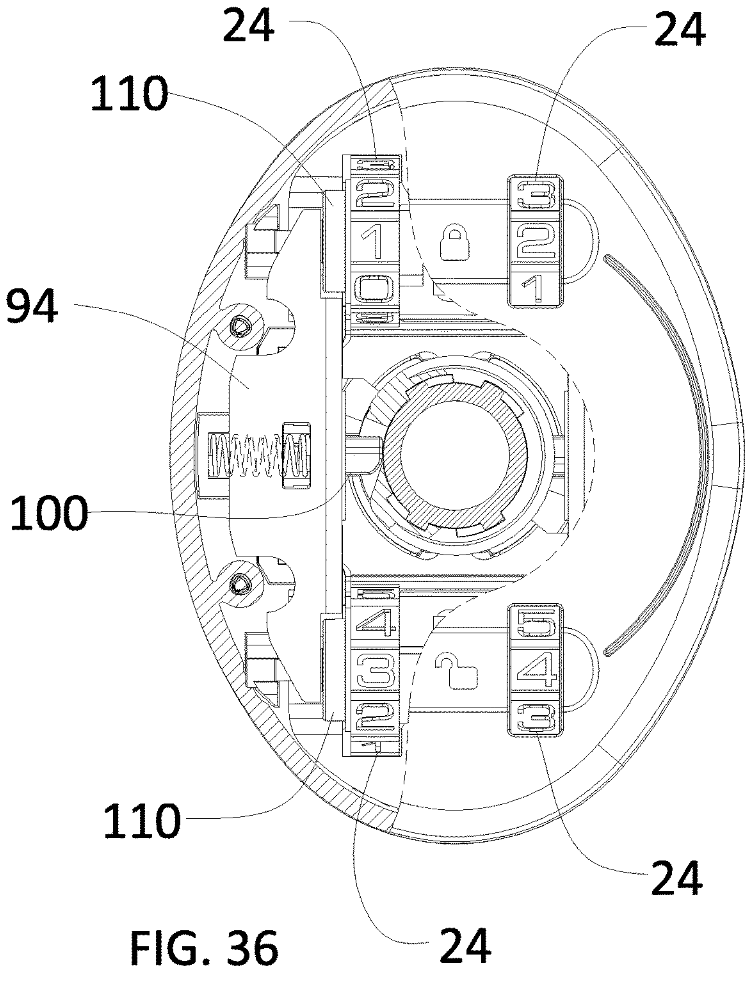
FIG. 36 is a front view of the lock assembly of FIG. 1, with the outer housing and the knob assembly in section view and certain elements removed for clarity, in the same position as shown in FIG. 33.
Figure 37:
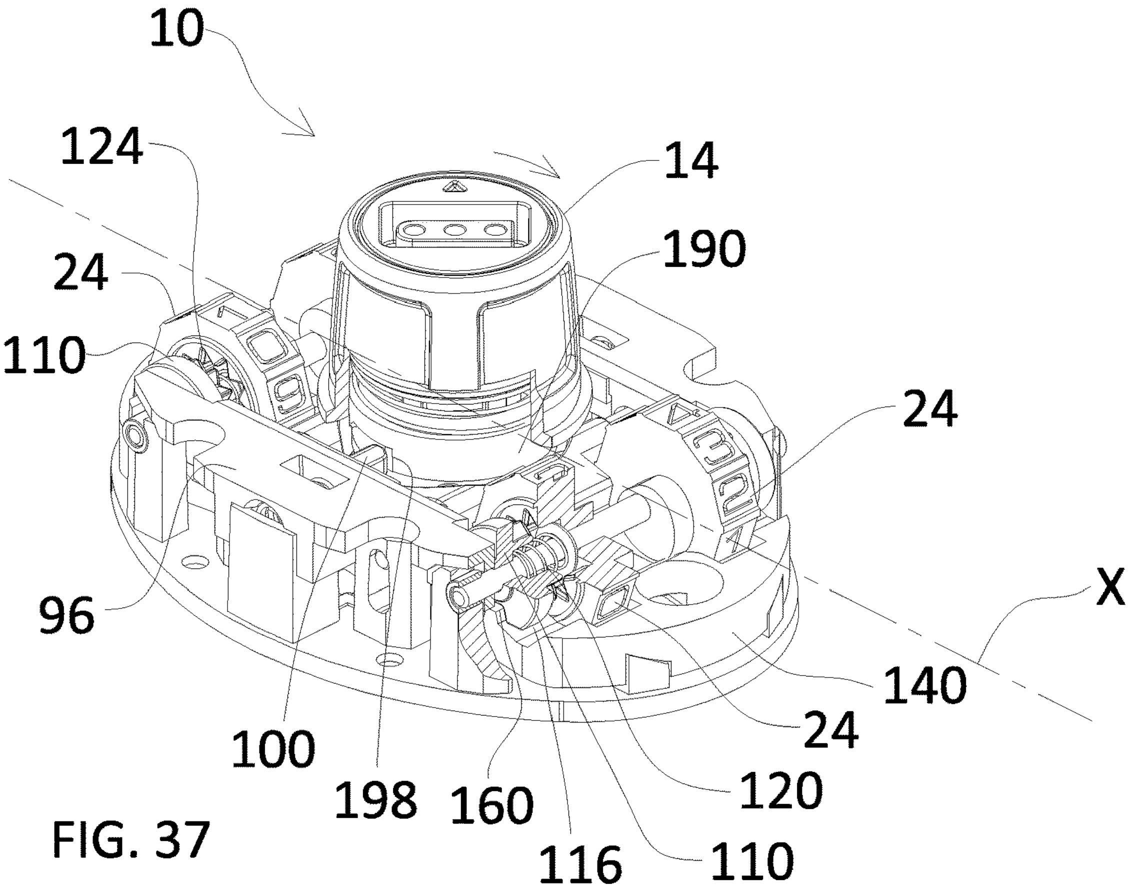
FIG. 37 is a perspective view of the lock assembly of FIG. 1, with the outer housing removed, in partial section view, and with the knob assembly rotated back toward the latched position, in a position where the toggle wheels are disengaged from the rotatable dials.
Figure 38:
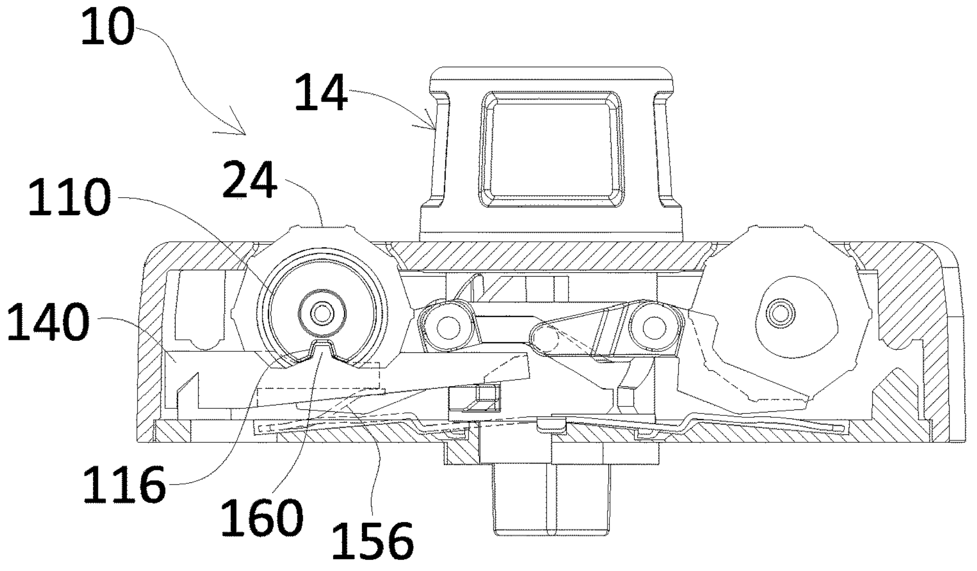
FIG. 38 is a side view of the lock assembly of FIG. 1, with the outer housing and back plate in section view and certain elements removed for clarity, in the same position as shown in FIG. 37.
Figure 39:
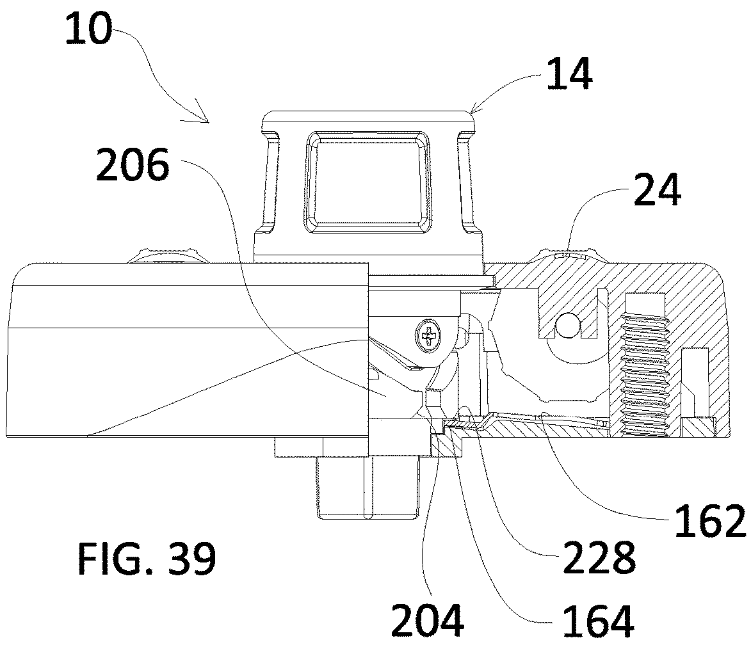
FIG. 39 is a side view of the lock assembly of FIG. 1, with the outer housing, back plate, and knob assembly in section view and certain elements removed for clarity, in the same position as shown in FIG. 37.
Figure 40:
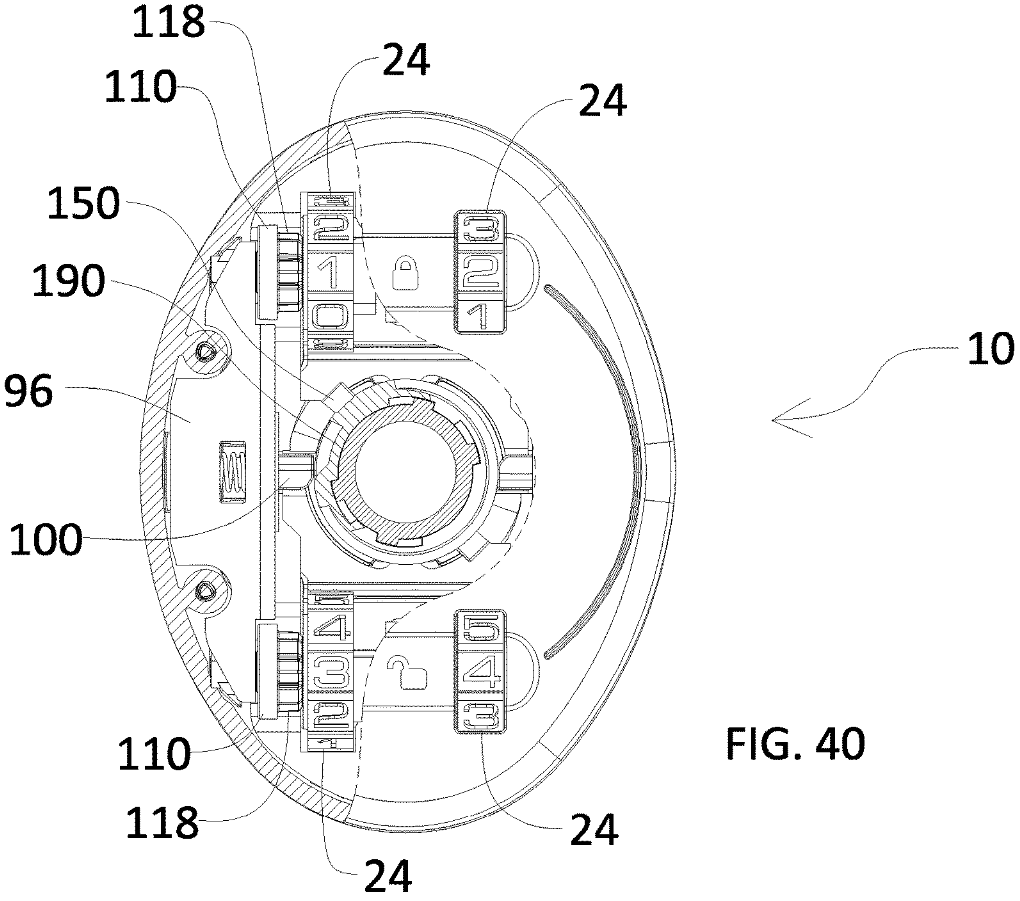
FIG. 40 is a front view of the lock assembly of FIG. 1, with the outer housing and the knob assembly in section view and certain elements removed for clarity, in the same position as shown in FIG. 37.
Figure 41:
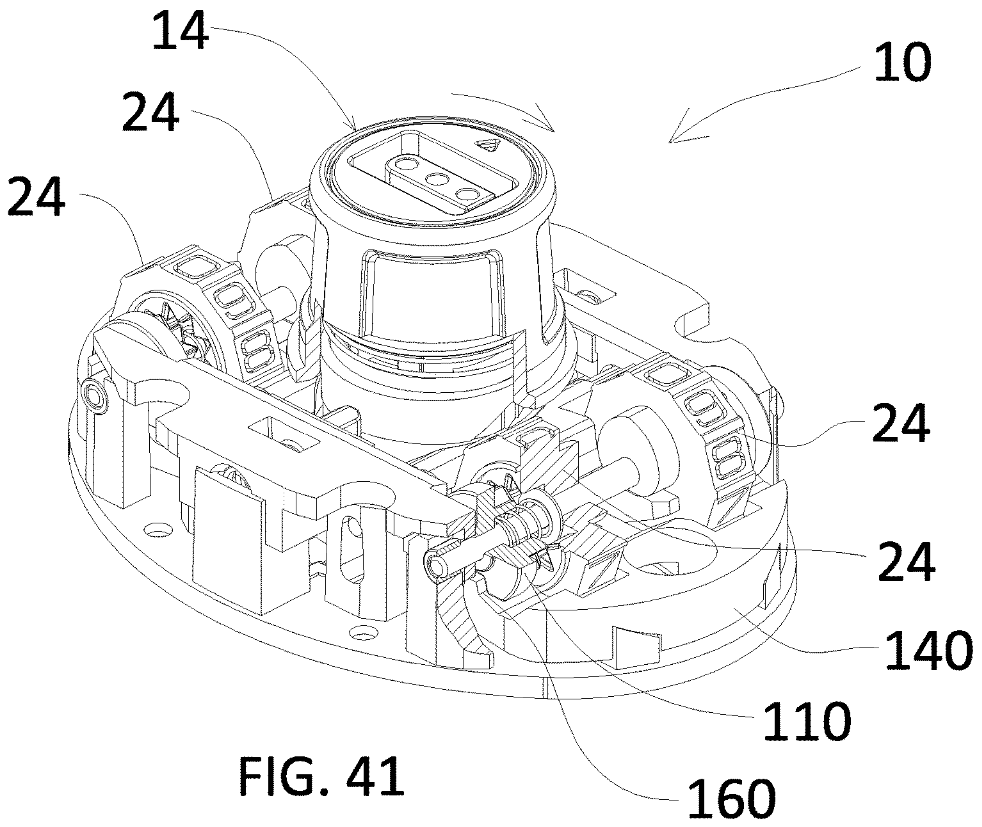
FIG. 41 is a perspective view of the lock assembly of FIG. 1, with the outer housing removed, in partial section view, and with the rotatable dials scrambled.
Figure 42:
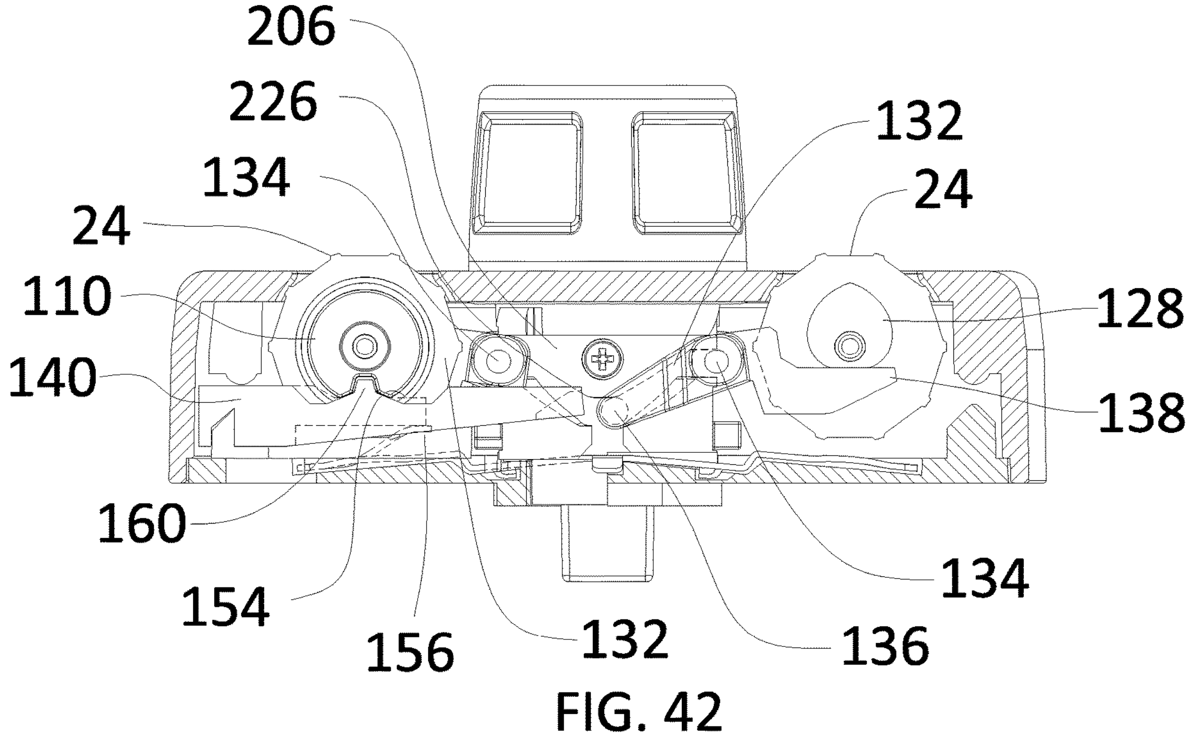
FIG. 42 is a side view of the lock assembly of FIG. 1, with the outer housing and back plate in section view and certain elements removed for clarity, in the same position as shown in FIG. 41.
Figure 43:
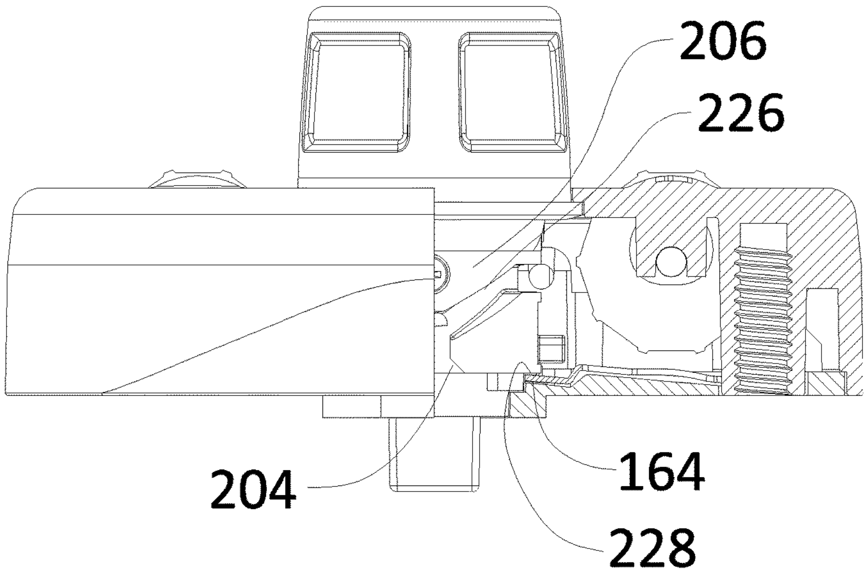
FIG. 43 is a side view of the lock assembly of FIG. 1, with the outer housing, back plate, and knob assembly in section view and certain elements removed for clarity, in the same position as shown in FIG. 41.

Because the lock plates 140 are in the locking position, as the knob assembly 14 is rotated from the position shown in FIG. 25 to the position shown in FIG. 29, the lock bar 150 rides up the return ramps 152 of the lock plates 140 and against the bias of the lock bar spring 210. Upon fully passing the return ramps 152, the lock bar 150 drops in behind the lock blocks 148 of the lock plate 140. The lock blocks 148 prevent rotation of the knob assembly 14 in the clockwise direction, and the interaction of the stopper 236 and the stopper slot 238 prevent further rotation of the knob assembly 14 in the counterclockwise direction. In this position, the ramped gaps 242 have again come to be disposed over the stands 164 of the spring plate 144, allowing the dial springs 162 to raise up again and bear against the rotatable dials 24 to again 'click' them into place.

It may be the end user's desire or expectation to have a full half turn rotation of the knob assembly 14 from the unlocked, unlatched position shown in FIG. 12 to the locked and latched position shown in FIG. 29. The rotational travel of the control ring 190 from the recessed ramps 196 to the angled slots 198, however, may be approximately 160 degrees. Accordingly, the slots 194 of the control ring 190 are wider than the tabs 184 of the cap 176. The first approximately 20 degrees of rotational travel of the knob assembly 14 is simply the tabs 184 sliding within the slots 194 of the control ring 190, with no movement of the control ring 190. See, in particular, FIG. **15*a*. Once the first 15 degrees have been met, the tabs 184 reach the other side of the slots 194 and being to cause rotation of the control ring 190. See, in particular, FIGS. 24 and 32**.

Referring now to FIGS. 33-36, the beginning of the process of unlocking and unlatching the lock assembly 10 is described. Here, the user has rotated the rotatable dials 24 back to the unlocking code 1-2-3-4. The side plates 94 continue to be shifted towards middle axis X, thereby keeping the toggle plates 110 engaged with the rotatable dials 24. By rotating all of the rotatable dials back to the unlocking code, the toggle plates 110 are rotated back to a position where their respective flat surfaces 114 are now bearing against the bearing faces 158 of the lock plates 140. This allows the lock plates 140 to shift upwardly towards the knob assembly 14, and thus the lock blocks 148 of the lock plates 140 do not impede the rotation in the clockwise direction of the lock bar 150. The lock plates 140 are biased in the up direction due to the lock spring 156 pushing against the spring tabs 154. The lock bar 150 is biased in the down position by the lock bar spring 210, and the lock assembly 10 is in the unlocked position.

As shown in FIGS. 37-40, the user has begun to rotate the knob assembly 14 in the clockwise direction to unlatch the lock assembly 10. As the knob assembly 14 is rotated, the lugs 100 of the side plates 96 ride up the angled slots 198 of the control ring 190 until they ride on the outer surface of the control ring 190. This pushes the side plates 96 in a direction away from middle axis X and allows the toggle plate springs 120 to push the toggle plates 110 in a direction away from middle axis X and to disengage the spur gears 118 from the ring gears 124 of the rotatable dials 24. As the toggle plates 110 are shifted, the notches 116 of the of the toggle plates

110 slide over and are disposed on the ridges 160 of the lock plates 140. This secures the toggles plates 110 in the unlocking position, while the rotatable dials 24 are free to rotate relative to the toggle plates 110. Moreover, as the knob assembly 14 is rotated, the stands 164 of the spring plate 144 are no longer underneath the ramped gaps 242 of the drive cylinder 230, and the knob bearing face 228 presses down on the stands 164, thereby forcing the dial springs 162 away from the rotatable dials 24 and allowing the rotatable dials 24 to rotate freely. The lock springs 156, however, continue to bias the lock plates 140 in the up positions.

Figure 44:
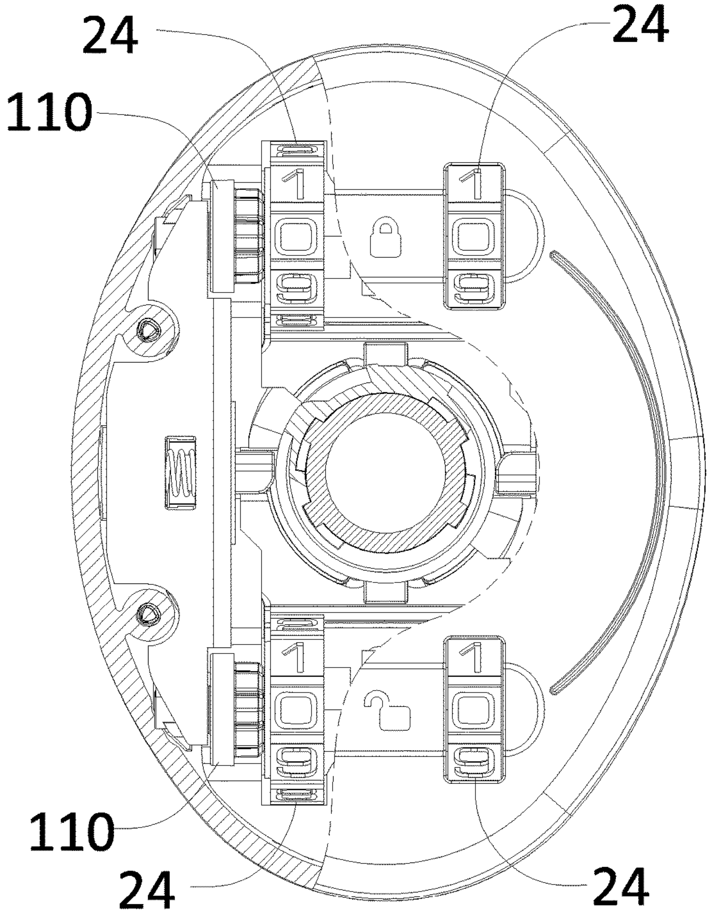
FIG. 44 is a front view of the lock assembly of FIG. 1, with the outer housing and the knob assembly in section view and certain elements removed for clarity, in the same position as shown in FIG. 41.
Figure 45:
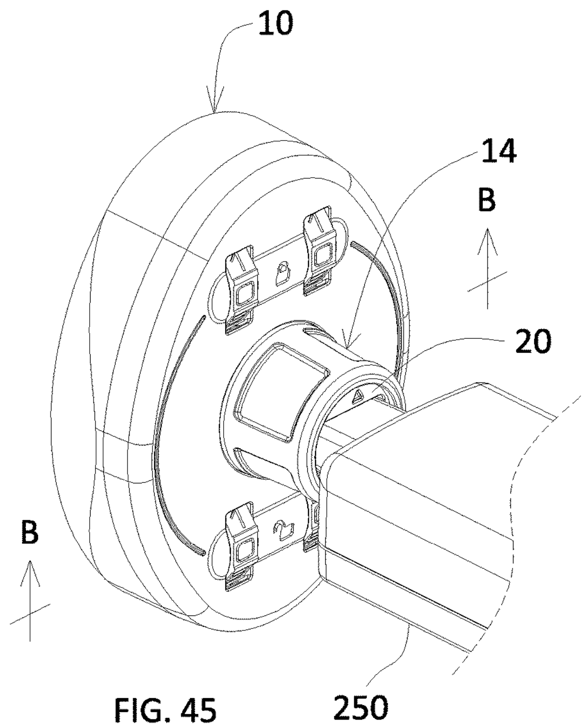
FIG. 45 is a perspective view of the lock assembly of FIG. 1 in the locked and latched position, but with an electronic override key applied.
Figure 46:
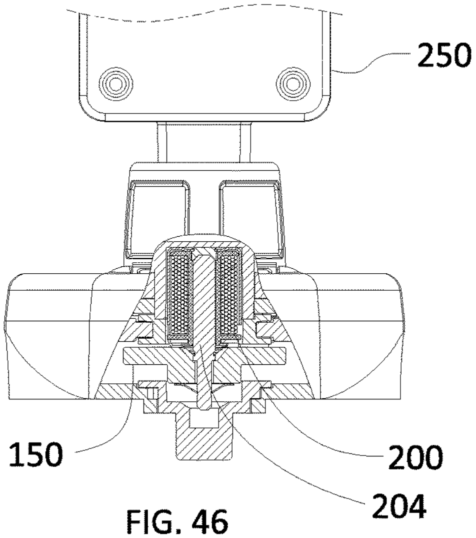
FIG. 46 is a bottom view in partial section of the lock assembly and key, taken along line B-B in FIG. 45.
Figure 47:
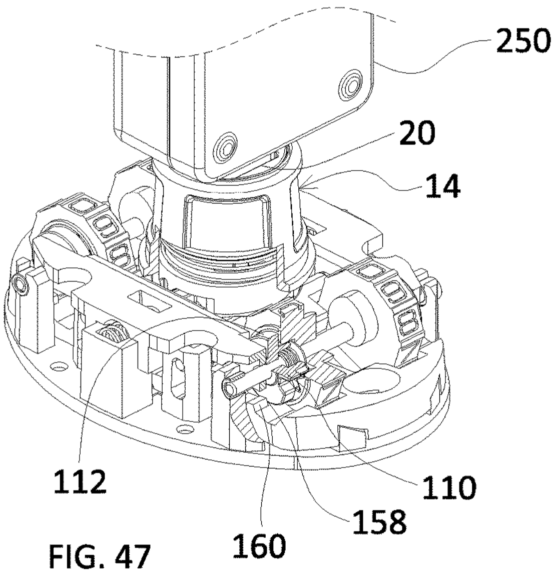
FIG. 47 is a perspective view of the electronic key and lock assembly and key of FIG. 45, with the outer housing removed, in partial section view, and with the knob assembly in the same position as in FIG. 45.
Figure 48:
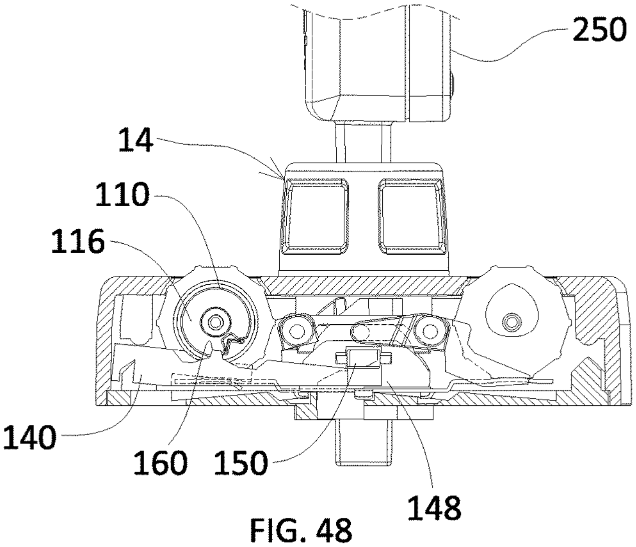
FIG. 48 is a side view of the lock assembly of FIG. 45, with the outer housing, back plate, and knob assembly in section view and certain elements removed for clarity, with the electronic override key applied, in the same position as shown in FIG. 45.

Referring now to FIGS. 41-44, the user continues turning the knob assembly 14 clockwise. In this position, the lock assembly 10 scrambles the rotatable dials 24 similarly to the process shown in FIGS. 25-28. As the knob assembly 14 is rotated, the knob bearing face 228 continues to press down on the stands 164, and the cam slots 226 of the drive module 206 drive the followers 136 of the return blocks 132 back toward the back plate 90. The return blocks 132 pivot about their pins 134, such that the drivers 138 bear against the eccentric cams 128 of the rotatable dials 24. The force exerted by the drivers 138 against the eccentric cams 128 causes the rotatable dials 24 to rotate such that the rotatable dials are rotated back to the 0-0-0-0 position, as best seen in FIG. 44. The toggle plates 110 continue to be mounted over the ridges 160 of the lock plate 140 and held fast while the rotatable dials 24 are rotated, and lock spring 156 continue to press against the spring tabs 154 of the lock plates 140, thereby maintaining the lock plates 140 in the up, unlocked position.

Where the user continues to rotate the knob assembly 14, they will put the lock assembly 10 into the position shown in FIGS. 12-15, which is the unlocked, unlatched position, the rotatable dials have been set to a 0-0-0-0 code, and the cycle is complete.

In certain scenarios, a user may set the lock code and place the lock into the locked and bolted position shown in FIGS. 29-32, but then the user may forget the lock code to unlock the locking assembly 10. Here, an administrator may implement an electronic key 250 to unlock and unlatch the locking assembly 10. As shown in FIGS. 45-48 and FIG. 8, the administrator may place the electronic key 250 into the opening 20 and against the port 22 and contacts 174 to provide data and power to the circuit board 172. If the proper credential is supplied, the electronics on the circuit board 172 may direct the solenoid actuator 200 to actuate, and the actuator 200 may retract the shaft 204 thereby lifting the lock bar 150. The lock bar 150 is then above the lock blocks 148 of the lock plates 140, and the knob assembly 14 may be rotated to the unlatched position. The toggle plates 110 remain in position with their respective circular outer surfaces 112 against the bearing surfaces 158 of the lock plates 140, and the notches 116 not in alignment with the ridges 160, pressing the lock plates 140 down.

Figure 49:
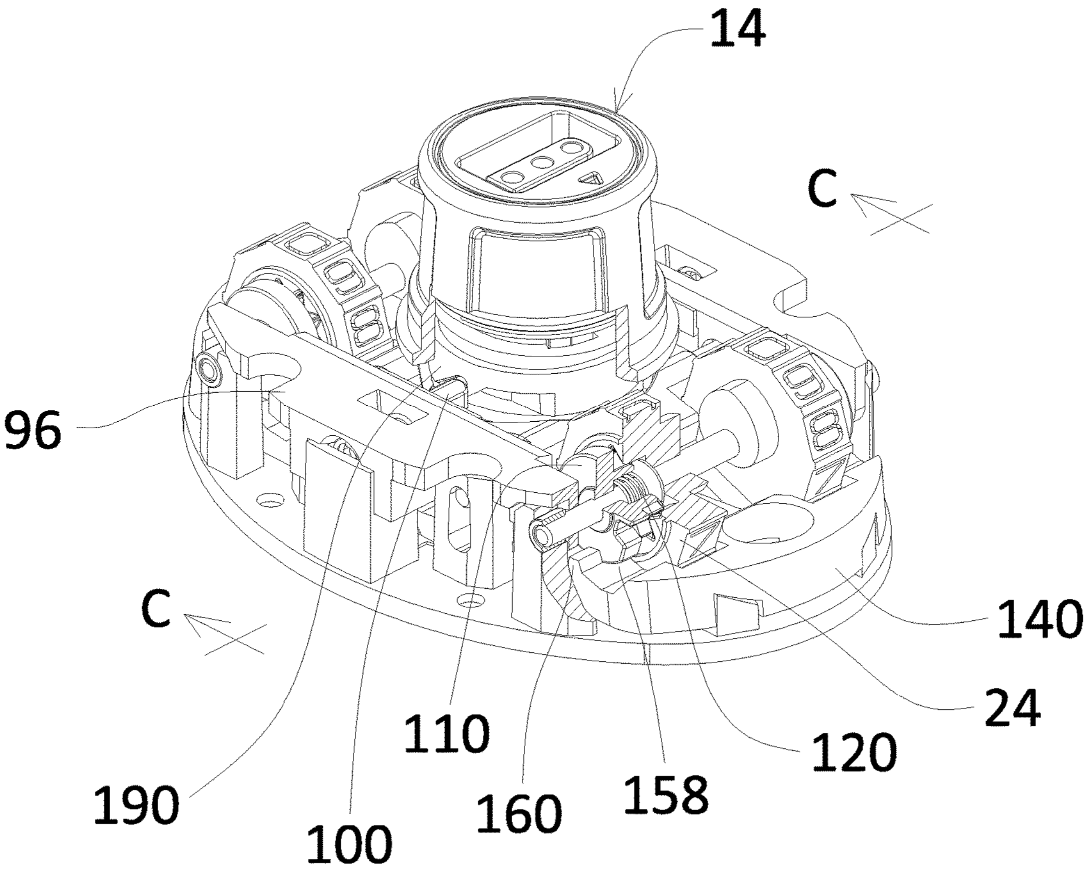
FIG. 49 is a perspective view of the lock assembly of FIG. 1, with an outer housing removed, in partial section view, and after the electronic key has been removed, in the locked but unlatched position.
Figure 50:
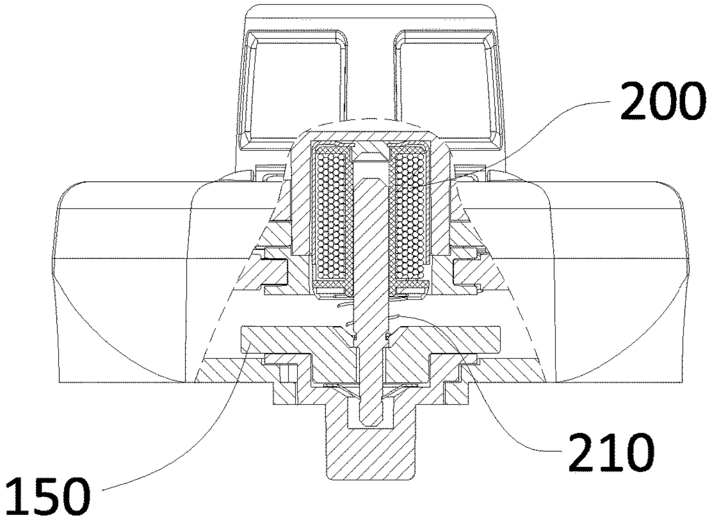
FIG. 50 is a bottom view of the lock assembly of FIG. 1, in partial section view taken along the line C-C in FIG. 49.
Figure 51:
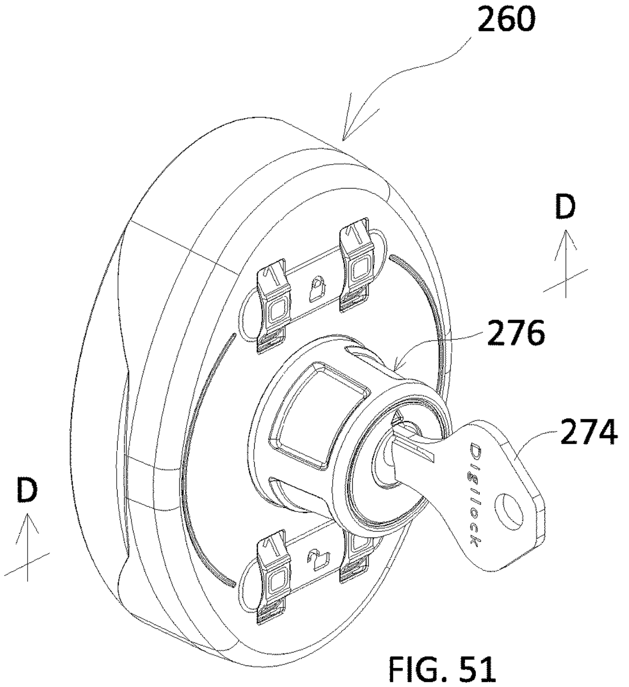
FIG. 51 is a perspective view of a third example of a lock assembly with a mechanical key override.
Figure 52:
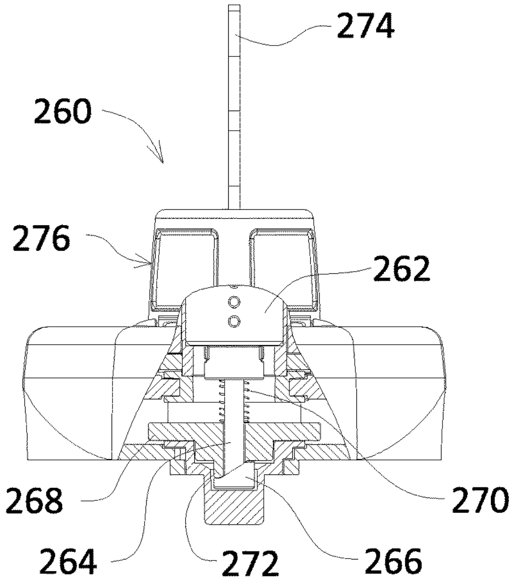
FIG. 52 is a bottom view of the lock assembly of FIG. 51 in partial section taken along line D-D in FIG. 51.
Figure 53:
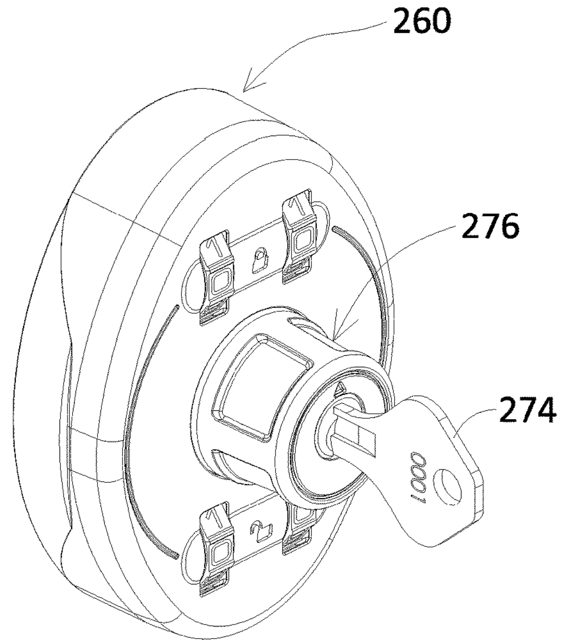
FIG. 53 is a perspective view of the lock assembly of FIG. 51 with the key override activated.
Figure 54:
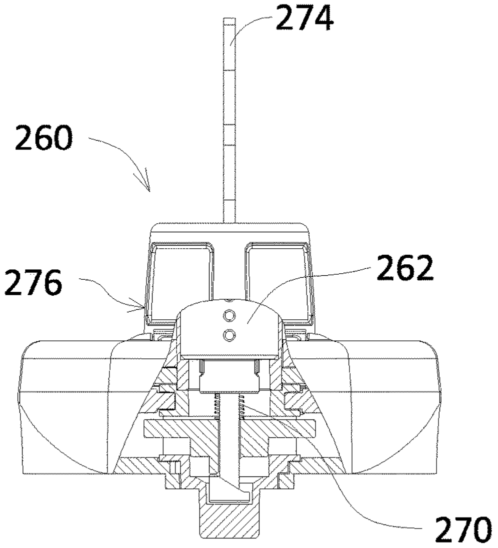
FIG. 54 is a bottom view of the lock assembly of FIG. 51 in partial section taken along line D-D in FIG. 51.

Referring now to FIGS. 49 and 50, the administrator has rotated the knob assembly fully to the unlatched position. The administrator has removed the electronic key 250, the solenoid 200 is no longer energized, and the lock bar spring 210 has biased the lock bar 150 downwardly.

In this position, however, the toggle plates 110 remain disposed over the bearing faces 158 of the lock plates 140, and the notches 116 are not aligned with the ridges 160. The side plates 96 are retracted away from middle axis X based on the lugs 100 interaction with the control ring 190, but the toggle plates 110 cannot retract away from the rotatable dials 24 under force of the toggle plate springs 120 because the notches 116 are not aligned with the ridges 160. The administrator or user must rotate each of the rotatable dials 24 a full rotation. At some point on the rotation, the notches 116 will align with the ridges 160, and the toggle plate springs 120 will force the toggle plates 110 away from middle axis X over the ridges 160, and the toggle plates will disengage from the rotatable dials 24. The lock assembly 10 will be in the position shown in FIG. 12, ready for the user to re-set the locking code and lock the lock assembly 10.

Referring now to FIGS. 51-54, a third example of a lock assembly 260 is disclosed showing a mechanical key override rather than an electronic key override. Here, rather than the solenoid actuator, the lock assembly 260 includes a pin tumbler lock 262 having an output shaft 264 and ramp 266. A lock bar 268 is disposed on the shaft 264 and biased downwardly by a lock bar spring 270. The lock bar 268 is similar in structure to the lock bar 150, except that the lock bar 268 includes a projection 272 that engages with the ramp 266. If the user forgets their combination, an administrator can insert a mechanical key 274 into the tumbler lock 260 and rotate the key 274 a half turn. This rotates the output shaft 264 and the ramp 266, which lifts the lock bar 268. The administrator can then rotate the knob assembly 276 a half turn to the unlatched position, then rotate the key 274 back a half turn to lower the lock bar 268 again and remove the mechanical key 274. As will be understood, the lock assembly 260 will be in the position shown in FIG. 49 at this point. The administrator can then rotate each of the rotatable dials 24 a full rotation to ensure that the toggle plates 110 are disposed over the ridges 160, as in the previous embodiment, and the lock assembly 260 will be back in the position shown in FIG. 12.

Referring now to FIGS. 55-84, a fourth example of a lock assembly 280 is depicted. In this example, the lock assembly 280 is configured to be in 'assigned use' mode. In other words, the unlocking combination is set and in normal usage the unlocking combination is not changed by an end user. Instead, changing the unlocking combination requires application of a manager key. Assigned use can be useful in settings such as school lockers, where the student uses the same combination for the entire school year, and the school facilities manager will maintain control over the manager key. The operation is different than the first embodiment (again known as 'shared use'), which again requires the user to set the unlocking combination with each use and allows for different users to use the lock. To accomplish the above differences in functionality relative to the first example, the lock assembly 280 has a slightly different construction. The same components, however, from the initial embodiment retain the same reference numerals.

Figure 55:
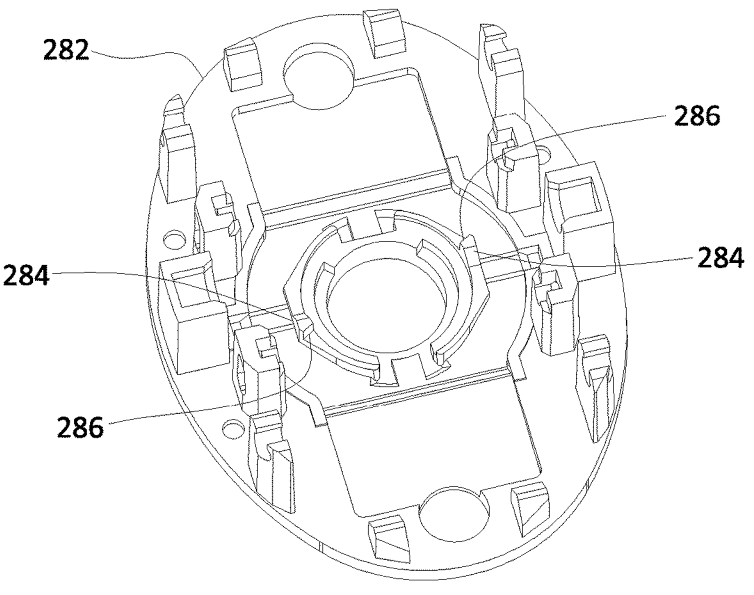
FIG. 55 is a perspective view of a back plate of a fourth example of a lock assembly, where the lock assembly can be in "assigned mode."

Referring now to FIG. 55, a back plate 282 of the lock assembly 280 is depicted. The back plate 282 includes a pair of stoppers 284 each having a blocking face 286. As will be seen, the blocking faces 286 limit rotation of the lock bar 150 in this embodiment and prevents an end user from altering the unlocking code.

Figure 56:
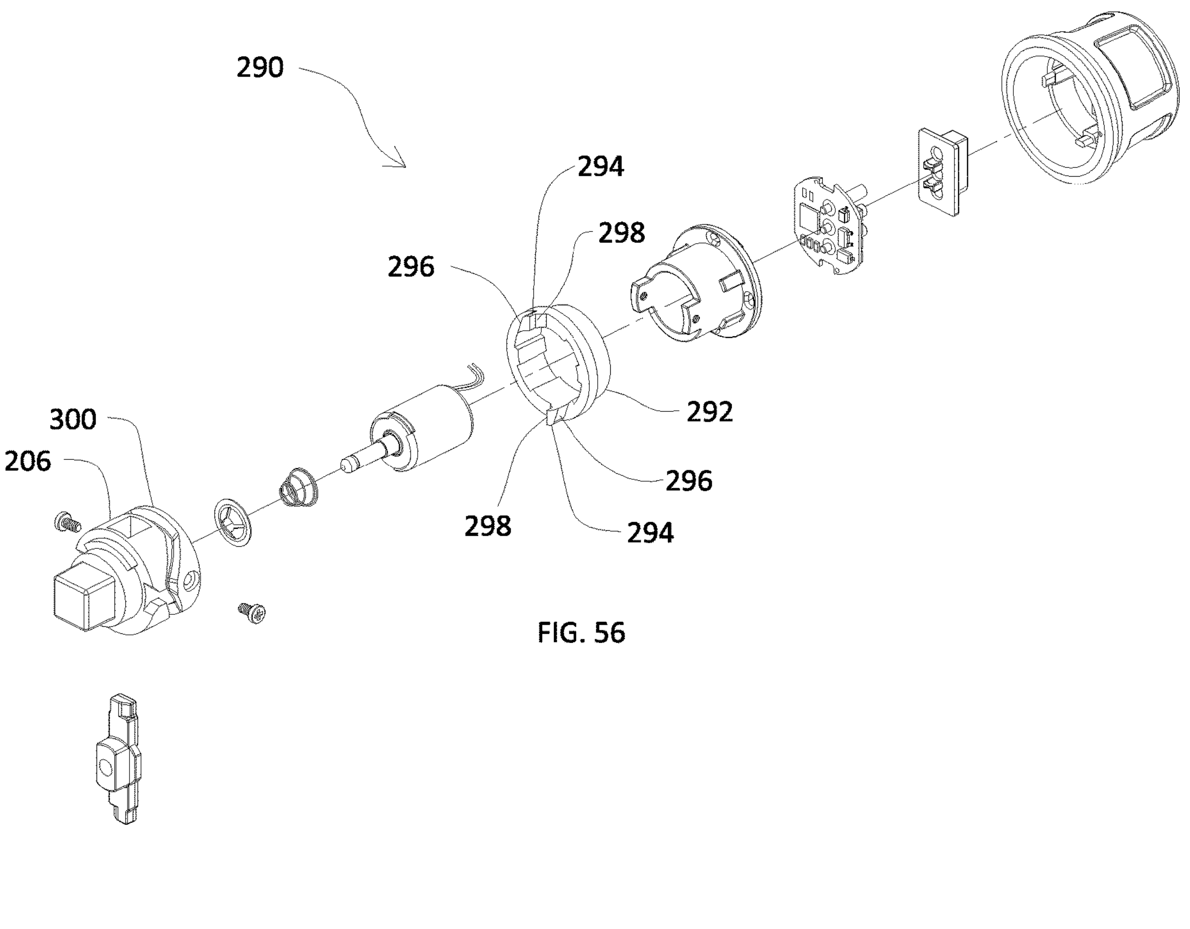
FIG. 56 is an exploded perspective view of a knob assembly of the fourth example of a lock assembly.
Figure 57:
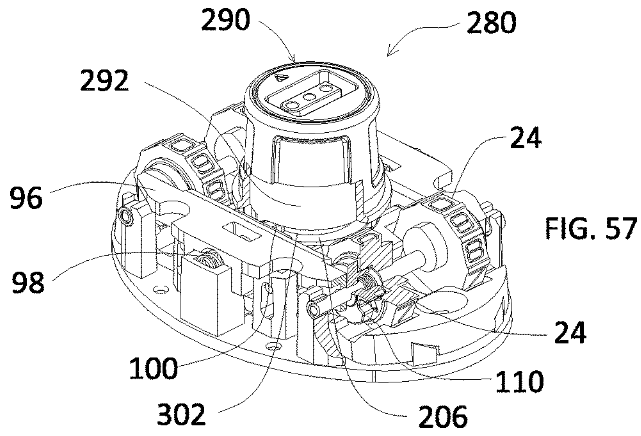
FIG. 57 is a perspective view of the fourth example of a lock assembly, with the outer housing removed, in partial section view, and in the locked and latched position.
Figure 58:
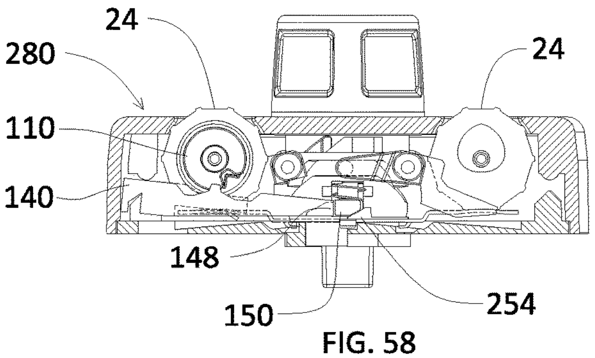
FIG. 58 is a side view of the lock assembly of FIG. 57, with the outer housing and back plate in section view and certain elements removed for clarity, in the same position as shown in FIG. 57.
Figure 59:
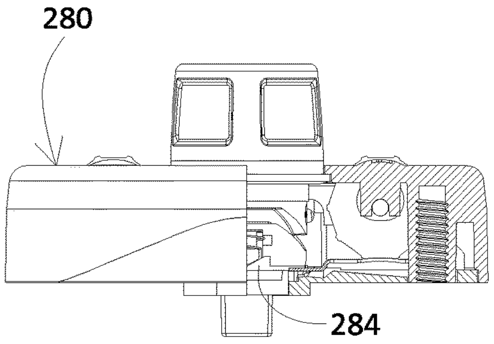
FIG. 59 is a side view of the lock assembly of FIG. 57, with the outer housing, back plate, and knob assembly in section view and certain elements removed for clarity, in the same position as shown in FIG. 57.
Figure 60:
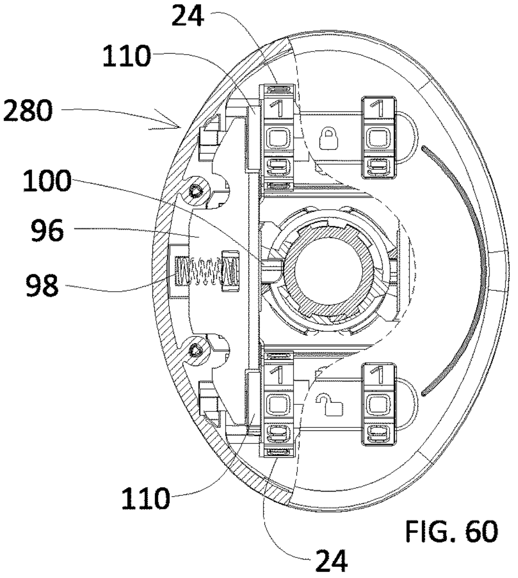
FIG. 60 is a front view of the lock assembly of FIG. 57, with the outer housing and the knob assembly in section view and certain elements removed for clarity, in the same position as shown in FIG. 57.
Figure 61:
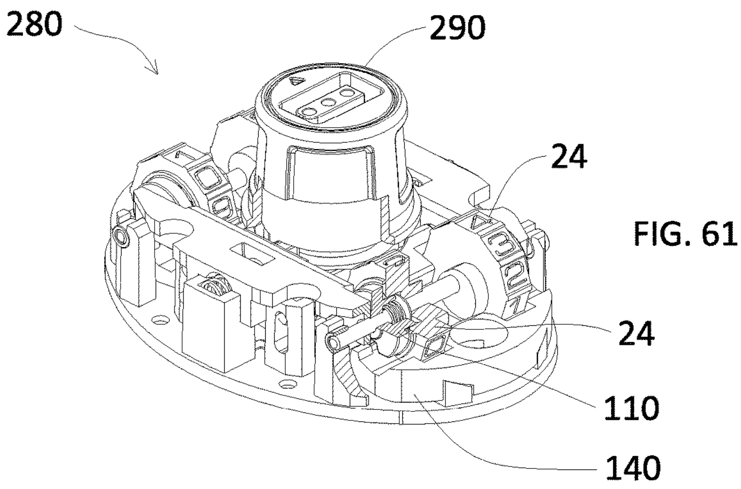
FIG. 61 is a perspective view of the lock assembly of FIG. 57, with the outer housing removed, in section view, and in the unlocked and latched position.
Figure 62:
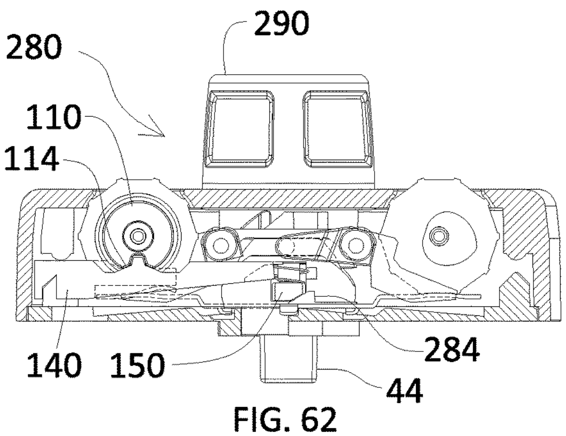
FIG. 62 is a side view of the lock assembly of FIG. 57, with the outer housing and back plate in section view and certain elements removed for clarity, in the same position as shown in FIG. 61.
Figure 63:
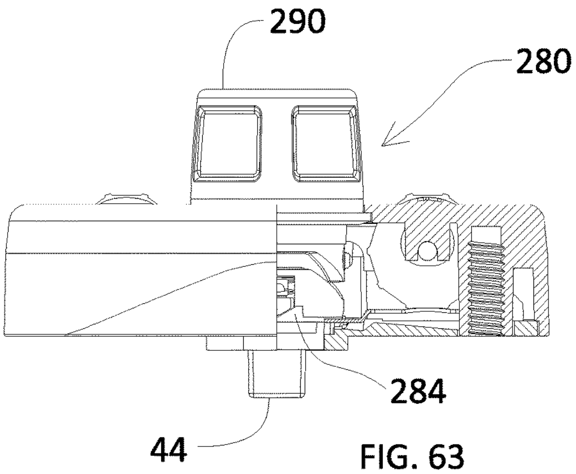
FIG. 63 is a side view of the lock assembly of FIG. 57, with the outer housing, back plate, and knob assembly in section view and certain elements removed for clarity, in the same position as shown in FIG. 61.
Figure 64:
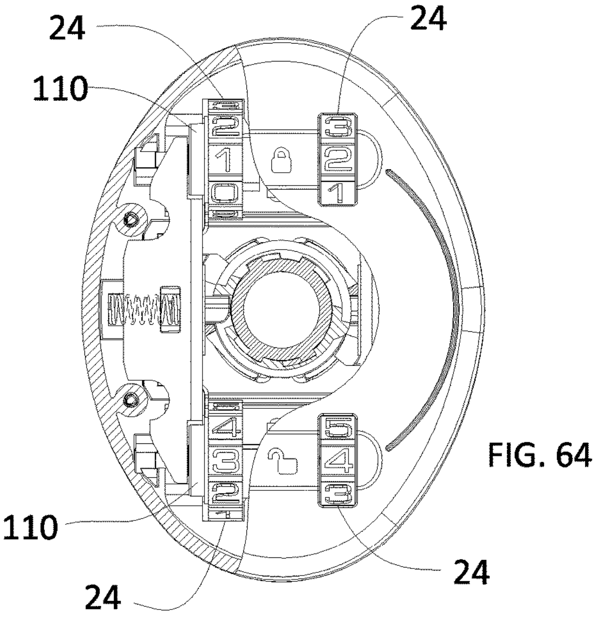
FIG. 64 is a front view of the lock assembly of FIG. 57, with the outer housing and the knob assembly in section view and certain elements removed for clarity, in the same position as shown in FIG. 61.
Figure 65:
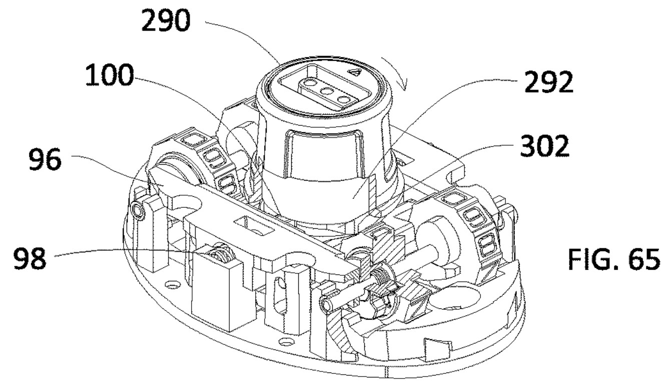
FIG. 65 is a perspective view of the lock assembly of FIG. 57, with the outer housing removed, in partial section view, and with the rotatable dials scrambled.
Figure 66:
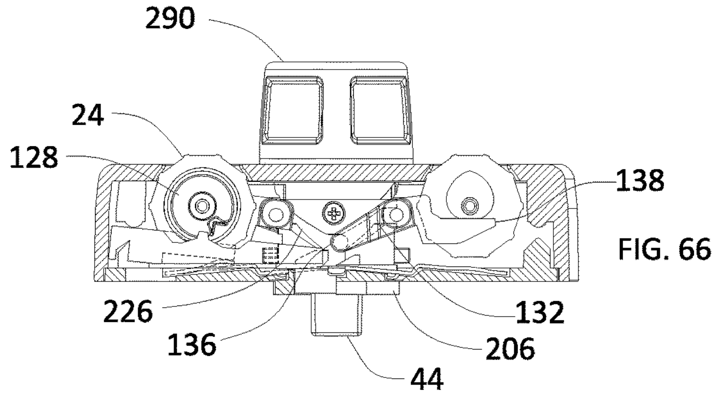
FIG. 66 is a side view of the lock assembly of FIG. 57, with the outer housing and back plate in section view and certain elements removed for clarity, in the same position as shown in FIG. 65.
Figure 67:
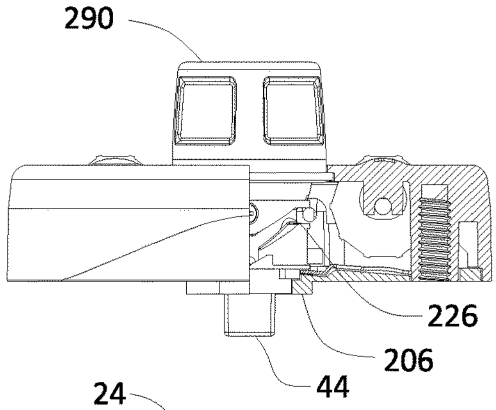
FIG. 67 is a side view of the lock assembly of FIG. 57, with the outer housing, back plate, and knob assembly in section view and certain elements removed for clarity, in the same position as shown in FIG. 65.
Figure 68:
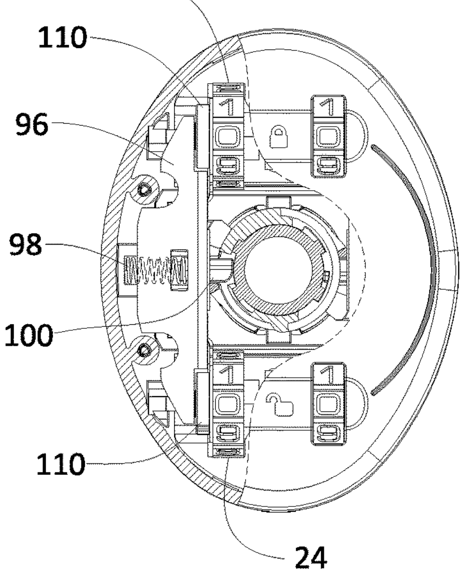
FIG. 68 is a front view of the lock assembly of FIG. 57, with the outer housing the knob assembly in section view and certain elements removed for clarity, in the same position as shown in FIG. 65.
Figure 69:
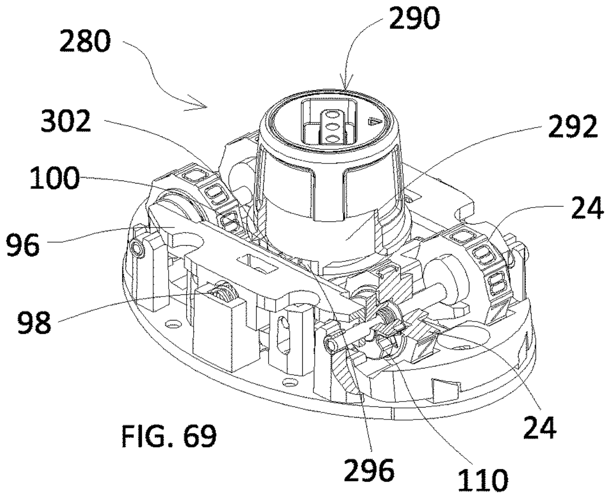
FIG. 69 is a perspective view of the lock assembly of FIG. 57, with the outer housing removed, in section view, and in the unlatched position.
Figure 70:
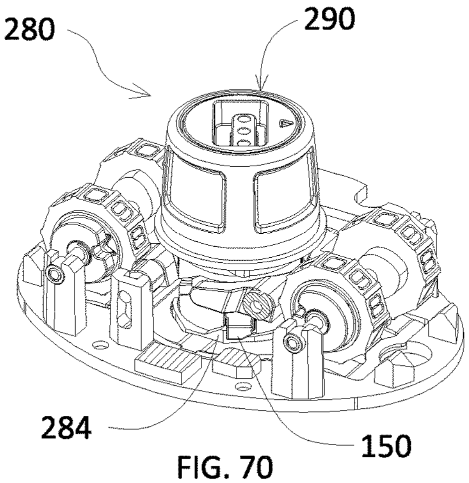
FIG. 70 is a second perspective view of the lock assembly of FIG. 57 with the outer housing removed, in partial section view, and in the unlatched position.
Figure 71:
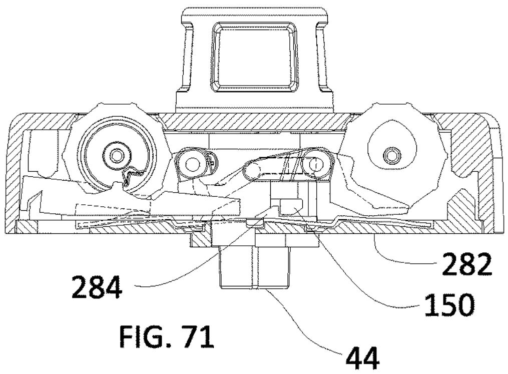
FIG. 71 is a side view of the lock assembly of FIG. 57, with the outer housing and back plate in section view and certain elements removed for clarity, in the same position as shown in FIG. 69.
Figure 72:
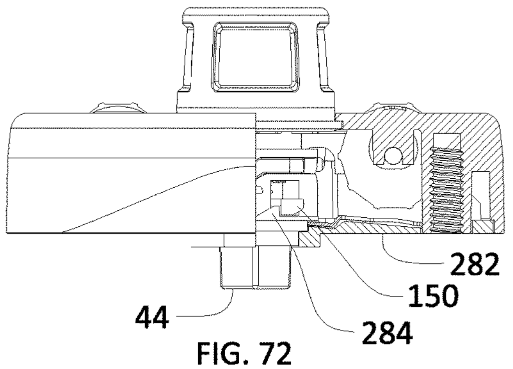
FIG. 72 is a side view of the lock assembly of FIG. 57, with the outer housing, back plate, and knob assembly in section view and certain elements removed for clarity, in the same position as shown in FIG. 69.
Figure 73:
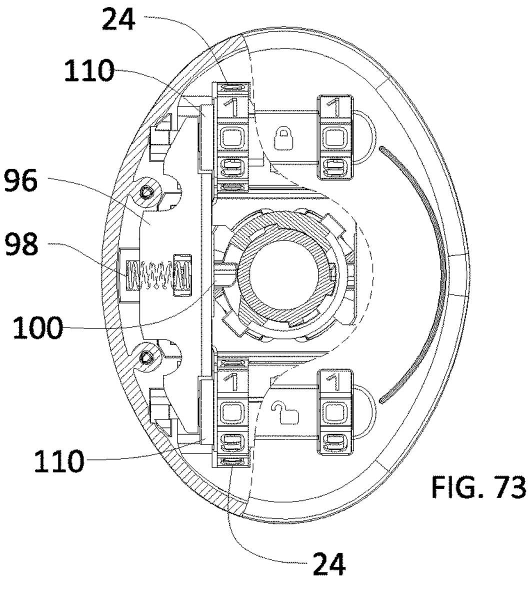
FIG. 73 is a front view of the lock assembly of FIG. 57, with the outer housing and the knob assembly in section view and certain elements removed for clarity, in the same position as shown in FIG. 69.

Referring now to FIG. 56, an exploded view of a knob assembly 290 is depicted. The knob assembly 290 is generally similar to the knob assembly 14 of the first embodiment, with a slightly modified control ring 292 and a lack of a cap spring 192. Here, the control ring 292 includes two projections 294 extending downwardly, each projection 294 including a ramp 296 and a block 298 opposite the ramp 296. When assembled, the projections 294 are disposed on a top face 300 of the drive module 206. As will be seen, the projections 294 space the control ring 292 from the drive module 206 to leave a gap therebetween.

Referring now to FIGS. 57-60, the lock assembly 280 is depicted in the locked and latched position. The rotatable dials 24 are set in the 0-0-0-0 position. The side plates 96 are disposed inwardly under the force of the side plate springs 98, with the lugs 100 disposed in a gap 302 between the control ring 262 and the drive module 206. As in the previous example, this forces the toggle plates 110 to be engaged with the rotatable dials 24. In this locked position, the toggle plates 110 force the lock plates 140 downwardly, which prevents the lock bar 150 from rotating and thereby prevents the user from rotating the knob assembly 260.

Referring now to FIGS. 61-64, the user has rotated the rotatable dials 24 to the unlocking code, 1-2-3-4. As in the previous embodiments, this aligns the flat surfaces 114 of the toggle plates 110 with the lock plates 140 and allows the lock plates 140 to rise up, thereby no longer impeding rotation of the lock bar 150 or the knob assembly 290.

The user may rotate the knob assembly 290, which will rotate the drive shaft 44, as shown in FIGS. 65-68. Similar to previous embodiments, the followers 136 of the return block 132 follow the cam slot 226 of the drive module 206 downwardly as in previous embodiments, thereby pushing the drivers 138 upwardly against the eccentric cams 128 of the rotatable dials 24. This scrambles the rotatable dials 24 back to 0-0-0-0. The lugs 100 of the side plates 96 remain disposed in the gap 302 between the control ring 292 and the drive module 206 under the force of the side plate springs 98, and the toggle plates 110 remain engaged with the rotatable dials 24.

As the user continues rotating the knob assembly 290, it will reach the position shown in FIGS. 69-73. In this position, the drive shaft 44 has been rotated sufficiently such that the locking element, such as the deadbolt 48 or the cam blade 62 of the first two embodiments is retracted and the user is able to open the panel 32 to which the lock assembly 280 is attached. The lugs 100 remain in the gap 302, and the side plate 96 continue to be forced inwardly by the side plate springs 98. In other words, the lugs 100 have not reached the ramps 296 of the control ring 292. Moreover, the stoppers 284 of the back plate 282 block further rotation of the lock bar 150, and therefore prevent the lugs 100 from reaching the ramps 296.

To re-lock the lock assembly 280, the user simply rotates the knob assembly 290 back to the position of FIGS. 57-60. While the knob assembly 290 is rotated back to that position, the lock plates 140 will be in the down position the entire time, but similar to previous embodiments, the lock bar 150 will slide up the return ramps 152 of the lock plates 140 and drop in behind the lock blocks 148 into the locking position.

Accordingly, during the entire locking and unlocking process by an end user, the sideplates 96 are disposed inwardly with the lugs 100 in the gap 302, and the toggle plates 110 are engaged with the rotatable dials 24. The unlocking combination, therefore, cannot be changed during normal use by the end user.

Figure 74:
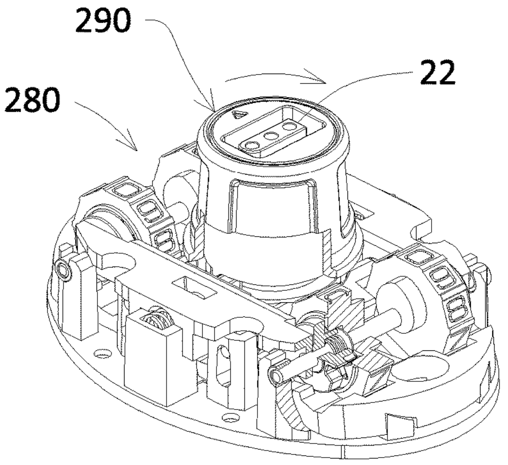
FIG. 74 is a perspective view of the lock assembly of FIG. 57, with the outer housing removed and in section view, in the locked and latched position.
Figure 75:
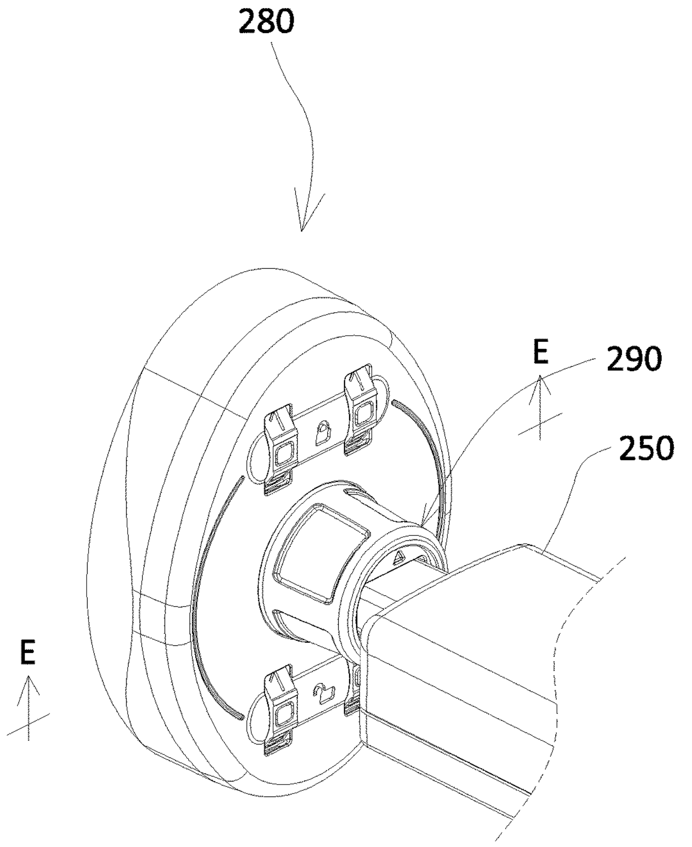
FIG. 75 is a perspective view of the lock assembly of FIG. 57, in the same position as shown in FIG. 74, but with an electronic override key applied.
Figure 76:
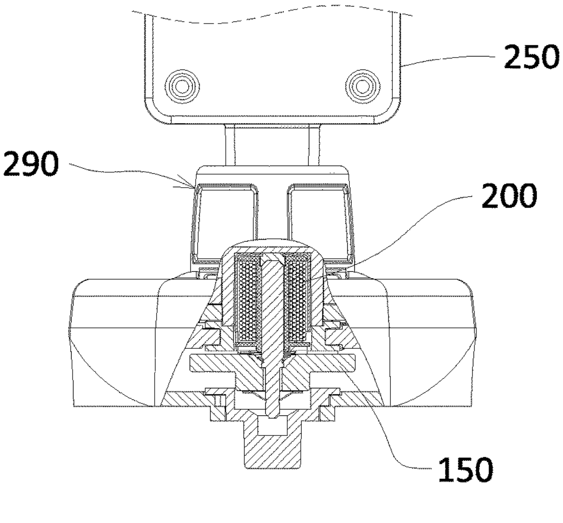
FIG. 76 is a bottom view of the lock assembly of FIG. 57, shown in partial section view taken along the line E-E in FIG. 75, with the electronic override key applied.
Figure 77:
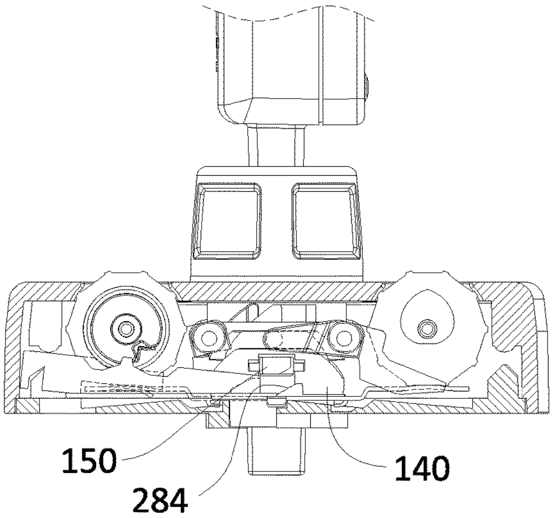
FIG. 77 is a side view of the lock assembly of FIG. 57, with the outer housing and back plate in section view and certain elements removed for clarity, in the same position as shown in FIG. 75.

Referring now to FIGS. 74-77, the process of opening the lock assembly 280 using an electronic key 250 by an administrator and re-setting the lock code is depicted. FIG. 74 depicts the lock assembly 280 in the locked and latched position, with the user desiring to unlock the lock and unlatch the door. The user first applies the electronic key 250 to the port 22, which applies power and data to the lock assembly 280. If the data includes the correct credential, the actuator 200 is activated, and it lifts the lock bar 150 up and above the lock plate 140. The user is then able to rotate the knob assembly 290 in the clockwise direction. Moreover, the lock bar 150 is above the stoppers 284, and therefore the stoppers 284 do not stop the rotation of the knob assembly 290, as in FIGS. 71 and 72, and the user may rotate the lock bar 150 past the stoppers 284.

Figure 78:
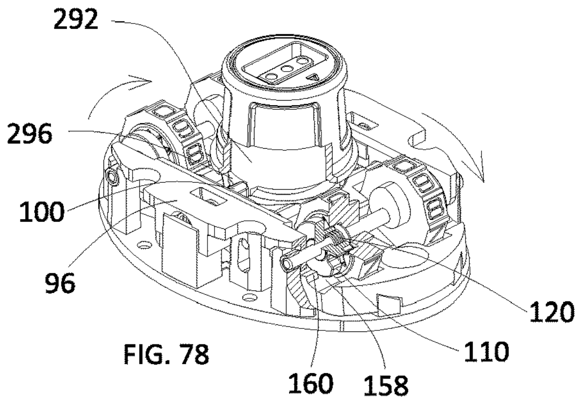
FIG. 78 is a perspective view of the lock assembly of FIG. 57, with an outer housing removed, in section view, and in the locked and unlatched position.

Referring now to FIGS. 78, the lock assembly is shown in the unlocked and unlatched position. In this position, the lock bar 150 has been rotated past the stoppers 284, and the lugs 100 of the side plates 96 have followed the ramp 296 of the control ring 292 away from middle axis X, thereby pushing the side plates 96 out. The administrator has removed the key 250, which causes the lock bar 150 to drop down.

Figure 79:
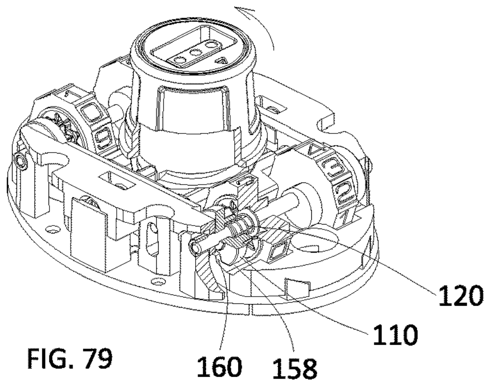
FIG. 79 is a perspective view of the lock assembly of FIG. 57, with an outer housing removed, in section view, and in the unlocked and unlatched position.
Figure 80:
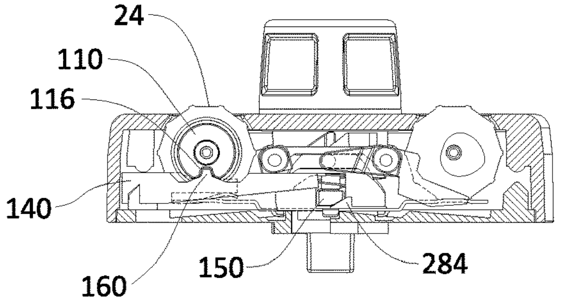
FIG. 80 is a side view of the lock assembly of FIG. 57, with the outer housing and back plate in section view and certain elements removed for clarity, in the same position as shown in FIG. 79.
Figure 81:
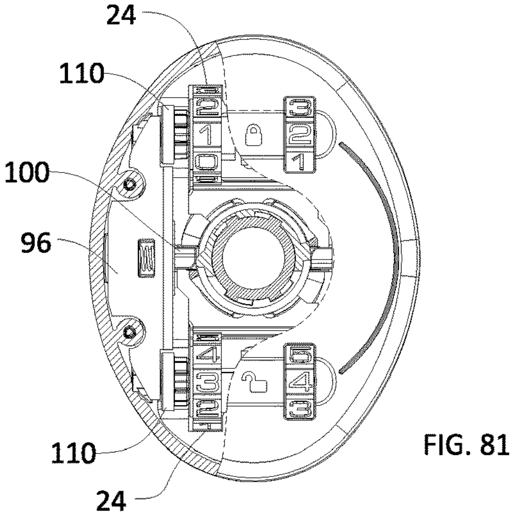
FIG. 81 is a front view of the lock assembly of FIG. 57, with the outer housing and the knob assembly in section view and certain elements removed for clarity, in the same position as shown in FIG. 79.

Referring now to FIG. 79, the end user has rotated the rotatable dials 24 a full turn which, at some point within the rotation, aligned the notches 116 of the toggle plates 110 with the ridges 160 of the lock plates 140, and the toggle plate springs 120 have forced the toggle plates 110 off the rotatable dials 24 and onto the ridges 160, placing the lock plates 140 in the unlocked up position and disengaged the toggle plates 110 from the rotatable dials 24. The user can then set the unlocking combination by rotating the rotatable dials 24. As shown in FIG. 81, the user has selected 1-2-3-4 as the unlocking code.

Figure 82:
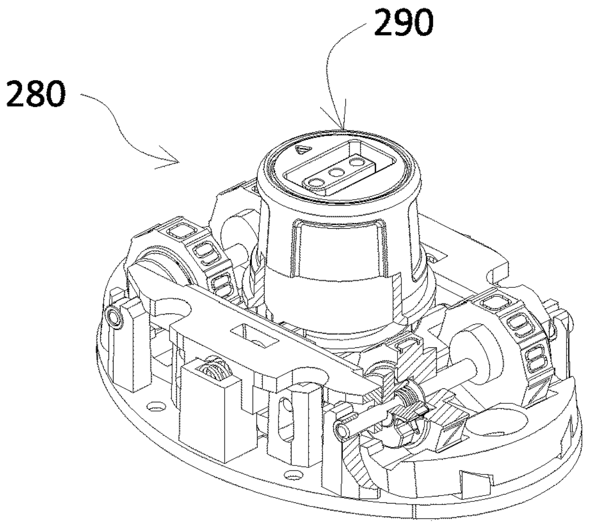
FIG. 82 is a perspective view of the lock assembly of FIG. 57, with the outer housing removed, in section view, and in the locked and latched position.
Figure 83:
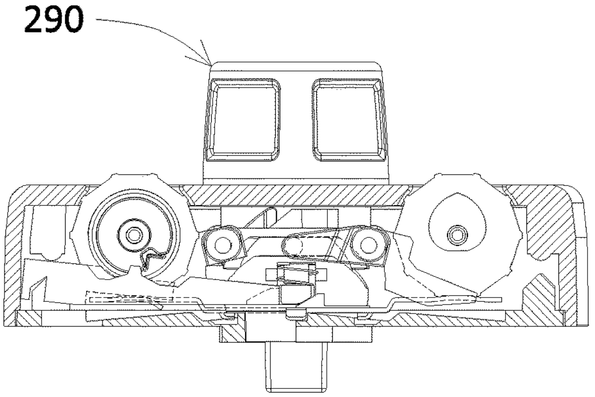
FIG. 83 is a side view of the lock assembly of FIG. 57, with the outer housing and back plate in section view and certain elements removed for clarity, in the same position as shown in FIG. 82.
Figure 84:
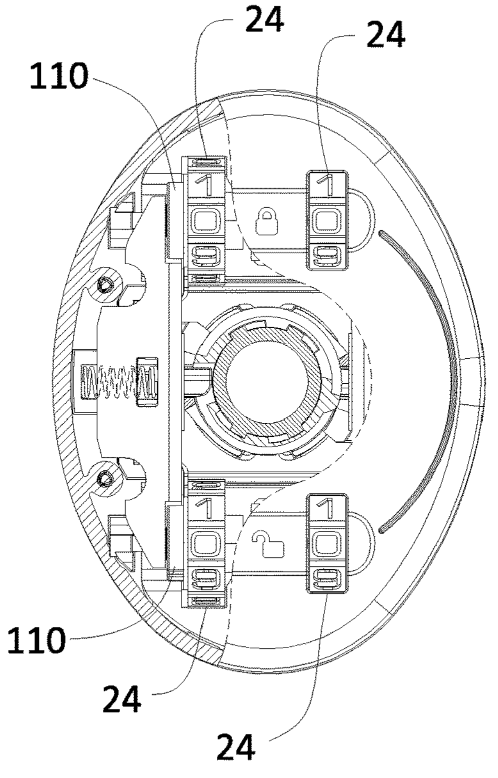
FIG. 84 is a front view of the lock assembly of FIG. 57, with the outer housing in partial section view and the knob assembly in section view and portions removed for clarity, in the same position as shown in FIG. 82.

Finally, the user can re-lock the lock assembly 280 as in previous embodiments as shown in FIGS. 82-84. The user has rotated the knob assembly 290 back a half turn counterclockwise. The rotatable dials 24 have been scrambled, the lock plates 140 have been pushed down to the locking position, and the latch bar 150 has ridden up the return ramps 152 of the lock plates 140 and dropped behind the latch blocks 148 into the locked position.

Alternatively, the administrator may unlock and unlatch the lock assembly 280 using the key 250 as shown in the processes of FIGS. 45-48 and/or 74-78, but upon opening the locker, the end user and administrator realize that they have opened another end user's lock and locker. This may happen, for example, where the end user has entered his or her own code, but the code is incorrect because he or she is accessing the wrong lock and locker, believing it to be his or hers. In this scenario, the administrator does not rotate the rotatable dials 24 a full turn as described above. Instead, the administrator simply pivots the knob assembly 290 back counterclockwise to the position shown in FIG. 74. As will be understood, by not rotating the rotatable dials 24 prior to pivoting the knob assembly 290 back, the orientation between the toggle plates 110 and the rotatable dials 24 remain unchanged, and therefore the unlocking code remains unchanged. The true user of the lock assembly 280 can then use the lock assembly 280 without disruption despite the administrator having unlocked and unlatched the lock assembly 280.

The invention claimed is:

1. A method of electronically overriding a mechanical lock having no battery, the method comprising:

providing a locking device in a locked position and latched position, the locking device comprising a housing, a knob assembly disposed at least partially in the housing, the knob assembly selectively rotatable relative to the housing about a knob axis between a latched position and an unlatched position, a lock bar operatively coupled to the knob assembly and disposed within the housing, the lock bar shiftable substantially parallel to the knob axis between an up position and a down position, a rotatable dial disposed on an axle, the axle being substantially perpendicular to the knob axis, the rotatable dial disposed at least partially within the housing and extending through an opening in the housing and being accessible from outside the housing, the rotatable dial including multiple indicia disposed thereon, at least one of the indicia being selectively visible from outside the housing, a toggle plate rotatably disposed on the axle and engagable with the rotatable dial, the toggle plate having an outer circumference, the outer circumference having a circular portion and a flat portion, and a lock plate having a bearing surface upon which the outer circumference of the toggle plate rotates, the lock plate shiftable between an unlocked position when the flat portion bears on the bearing surface and a locked position when the circular portion bears on the bearing surface, the lock plate further including a blocking face, the lock plate being in the locked position, the lock bar being in the down position, and the blocking face of the lock plate blocking the lock bar to prevent rotation of the knob assembly;

applying an electronic key to a port in the knob assembly, data and power being transferred from the key to the at least one processor via the port, wherein upon receipt of a predetermined credential from the electronic key at the port, the at least one processor activates an actuator to shift the lock bar to the up position; and rotating the knob assembly from the latched position to an unlatched position.

2. The method of claim 1, further comprising rotating the rotatable dial a full turn to align a notch in the toggle plate with a ridge in the lock plate.

3. The method of claim 2, further comprising the toggle plate sliding laterally to disengage from the rotatable dial and dispose over the ridge in the lock plate.

4. The method of claim 3, further comprising further rotating the rotatable dial such that a selected indicium is visible from outside the housing to set an unlock code.

5. The method of claim 4, further comprising rotating the knob assembly back to the locked and latched position.

6. The method of claim 5, further comprising translating the toggle plate laterally to engaging with the rotatable dial.

7. The method of claim 6, further comprising scrambling the rotatable dial such that a different indicium is visible.

8. The method of claim 1, further comprising rotating the knob assembly back to the locked and latched position without setting a new unlock code.

9. The method of claim 8, further comprising translating the toggle plate laterally to engage with the rotatable dial.

10. The method of claim 9, further comprising scrambling the rotatable dial such that a different indicium is visible.

11. A method of overriding a mechanical lock with a mechanical key, the method comprising:

providing a locking device in a locked position and latched position, the locking device comprising a housing, a knob assembly disposed at least partially in the housing, the knob assembly selectively rotatable relative to the housing about a knob axis between a latched position and an unlatched position, a lock bar operatively coupled to the knob assembly and disposed within the housing, the lock bar shiftable substantially parallel to the knob axis between an up position and a down position, a rotatable dial disposed on an axle, the axle being substantially perpendicular to the knob axis, the rotatable dial disposed at least partially within the housing and extending through an opening in the housing and being accessible from outside the housing, the rotatable dial including multiple indicia disposed thereon, at least one of the indicia being selectively visible from outside the housing, a toggle plate rotatably disposed on the axle and engagable with the rotatable dial, the toggle plate having an outer circumference, the outer circumference having a circular portion and a flat portion, a lock plate having a bearing surface upon which the outer circumference of the toggle plate rotates, the lock plate shiftable between an unlocked position when the flat portion bears on the bearing surface and a locked position when the circular portion bears on the bearing surface, the lock plate further including a blocking face, the lock plate being in the locked position, the lock bar being in the down position, and the blocking face of the lock plate blocking the lock bar to prevent rotation of the knob assembly;

inserting a mechanical key in a port in the knob assembly into a mechanical pin tumbler lock, rotating the mechanical key to rotate a actuator, the actuator including a ramp, the ramp shifting the lock bar to the up position; and rotating the knob assembly from the latched position to the unlatched position.

12. The method of claim 11, further comprising rotating the rotatable dial a full turn to align a notch in the toggle plate with a ridge in the lock plate.

13. The method of claim 12, further comprising the toggle plate sliding laterally to disengage from the rotatable dial and dispose over the ridge in the lock plate.

14. The method of claim 13, further comprising further rotating the rotatable dial such that a selected indicium is visible from outside the housing to set an unlock code.

15. The method of claim 14, further comprising rotating the knob assembly back to the locked and latched position.

16. The method of claim 15, further comprising translating the toggle plate laterally to engaging with the rotatable dial.

17. The method of claim 16, further comprising scrambling the rotatable dial such that a different indicium is visible.

18. The method of claim 11, further comprising rotating the knob assembly back to the locked and latched position without setting a new unlock code.

19. The method of claim 18, further comprising translating the toggle plate laterally to engage with the rotatable dial.

20. The method of claim 19, further comprising scrambling the rotatable dial such that a different indicium is visible.

* * * * *